United States Patent [19]
Yumoto et al.

[11] Patent Number: 5,802,399
[45] Date of Patent: Sep. 1, 1998

[54] DATA TRANSFER CONTROL UNIT FOR REDUCING MEMORY REQUIREMENTS IN AN INFORMATION PROCESSOR BY CONVERTING BIT WIDTH OF DATA BEING TRANSFERRED BETWEEN MEMORY AND PROCESSING PARTS

[75] Inventors: Manabu Yumoto; Tsuyoshi Muramatsu; Souichi Miyata, all of Nara, Japan

[73] Assignee: Sharp Kabushiki Kaisha, Osaka, Japan

[21] Appl. No.: 679,147

[22] Filed: Jul. 12, 1996

[30] Foreign Application Priority Data

Sep. 22, 1995 [JP] Japan ................................ 7-244573

[51] Int. Cl.⁶ ........................................................ G06F 3/00
[52] U.S. Cl. ........................................................ 395/886
[58] Field of Search ................................ 395/380, 823, 395/307, 886

[56] References Cited

U.S. PATENT DOCUMENTS 4,837,678  6/1989  Culler .................................. 395/380
4,947,366  8/1990  Johnson ............................... 395/823
5,548,766  8/1996  Keneko ................................ 395/307

FOREIGN PATENT DOCUMENTS 6209504  7/1994  Japan .

*Primary Examiner*—Thomas C. Lee
*Assistant Examiner*—David Ton

[57] ABSTRACT

A data transfer control unit for controlling data transfer between a main processing part executing information processing and a memory part accessed by the main processing part has a bit width control part for controlling the bit width of the transferred data so that a first bit width of a port for data input/output on the main processing part side is matched with a second bit width, which is narrower than the first bit width, of a port for data input/output on the memory part side. This bit width control part has a function of converting the bit width of the data to the second bit width in case of data transfer from the main processing part to the memory part and a function of converting the same to the first bit width in case of data transfer from the memory part to the main processing part. Thus, the capacity of the memory part can be reduced by adjusting the bit width of the data transferred between the main processing part and the memory part.

13 Claims, 33 Drawing Sheets

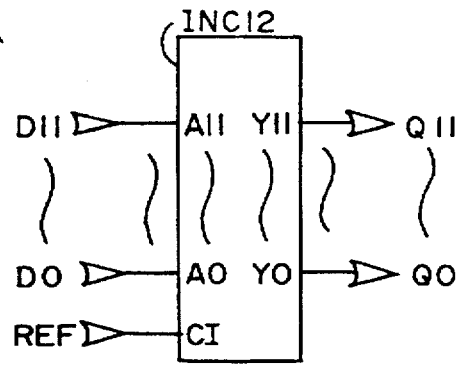
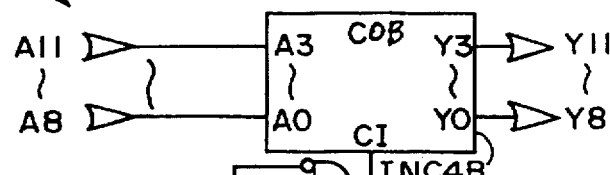
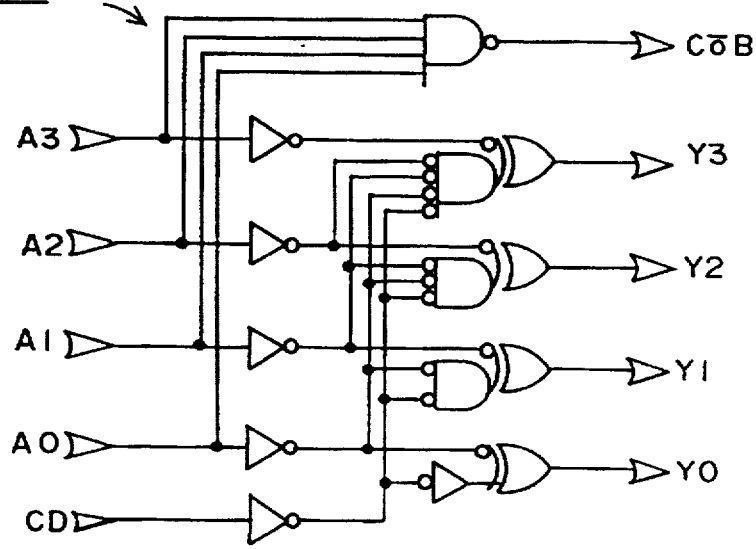
FIG.12
(a) ROUND12
(b) INC12
(c) INC4B

*FIG.18*
(a)
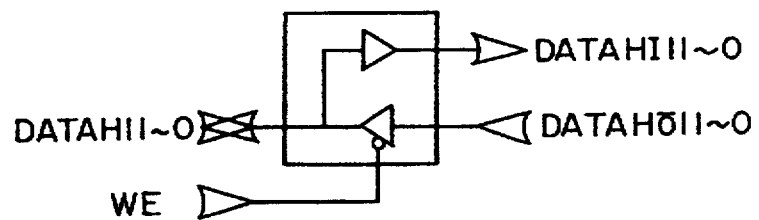
(b)
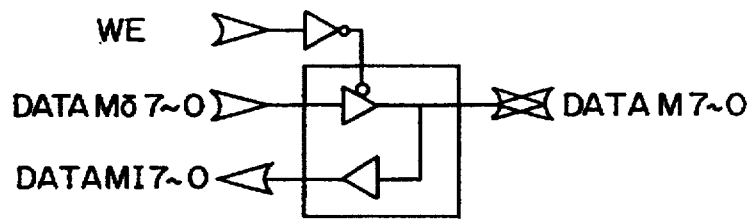

(a)
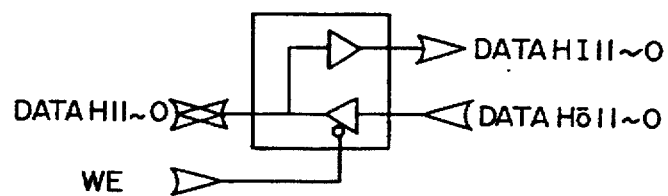
(b)
FIG.30
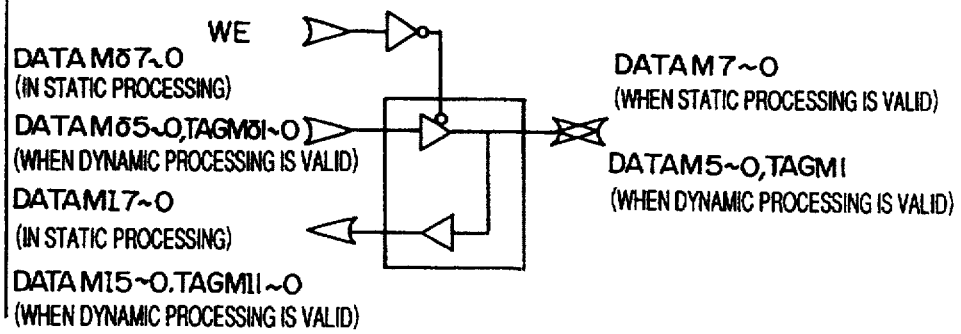

DATA TRANSFER CONTROL UNIT FOR REDUCING MEMORY REQUIREMENTS IN AN INFORMATION PROCESSOR BY CONVERTING BIT WIDTH OF DATA BEING TRANSFERRED BETWEEN MEMORY AND PROCESSING PARTS

BACKGROUND OF THE INVENTION

1. Field of the Invention

The present invention relates to a data transfer control unit, and more particularly, it relates to a data transfer control unit for controlling data transfer between a main processing part executing information processing and a memory part accessed by the main processing part in an information processor.

2. Description of the Background Art

In development of an information processor, it is generally necessary to reduce the cost. In order to attain such cost reduction, it is important to reduce the memory capacity of the processor. With such a background, a memory which is employed in an arbitrary information processing system may not have a bit width corresponding to that of data transferred between a main processing part in the system and a memory part accessed by this main processing part in general. In case of this system, the following connection form is generally employed mainly between the main processing part and the memory part:

FIG. 33 is adapted to illustrate exemplary connection between a main processing part 1000 and a memory part 2000 in a conventional information processor. Referring to FIG. 33, the main processing part 1000 is connected with the memory part 2000 while the bit widths of data transferred therebetween are mismatched with each other.

The main processing part 1000 and the memory part 2000 are connected with each other through a data system channel 3000 for transferring data to be read from/written in the memory part 2000 and a non-data system channel 4000 for transmitting read/write address signals for the data read from/written in the memory part 2000 through the channel 3000, control signals and the like. The main processing part 1000 includes a memory access port 1001 for accessing the memory part 2000, and this port 1001 includes a data system port 1002 (bit width h=12 bits) which is connected with the channel 3000 and a non-data system port 1003 which is connected with the channel 4000. On the other hand, the memory part 2000 includes a data system port 2002 (bit width m=8 bits) which is connected with the channel 3000 and a non-data system port 2003 which is connected with the channel 4000.

Referring to FIG. 33, the bit number of data in the memory access port 1001 of the main processing part 1000 related to access to the memory part 2000 is 12, and that of data in the memory part 2000 is 8. In this case, eighth to first bits d8 to d1 of the data system port 1002 of the main processing part 1000 are employed. In this case, however, it is assumed that arithmetic processing can be executed with no trouble through access by only a partial region (the eighth to first bits d8 to d1) of the data bit width on the main processing part 1000 side, i.e., the data to be accessed is a positive integer whose domain of variability is ascertained.

Japanese Patent Laying-Open No. 6-208504 (1994) discloses a unit for converting data bit widths between a main processing part and a memory part in an information processor. The unit disclosed in this gazette is characterized in that the bit width of a data bus between these parts can be reduced by performing a series of processing consisting of operations for converting the bit width of the data transferred between the main processing part and the memory part, time-sharing the data of the main processing part for transferring the same to the memory part, and coupling a set of the data of the memory part for transferring the same to the main processing part, thereby miniaturizing the overall unit.

When no memory having a data bit width corresponding to that on a main processing part side of data transferred between the main processing part and a memory part is necessary in an arbitrary information processing system and correct arithmetic processing cannot be performed by simply reducing the data bit width on the memory part side while simply using a partial region (eighth to first bits d8 to d1) of the data bit width on the main processing part side, i.e., when data of the main processing part are to be written in the memory, clipping processing or roundoff processing may be required.

In order to avoid such a trouble of incorrect arithmetic processing, a memory part having a bit width which is matched with that of the data transferred between the same and the main processing part may be employed. In this case, however, the total memory capacity is increased, leading to increase in manufacturing cost of the information processor.

In the unit disclosed in Japanese Patent Laying-Open No. 6-208504, further, the bus width of the data bus is reduced by bit width conversion of the transferred data thereby promoting miniaturization of the unit. However, the total memory capacity related to memory elements itself is not reduced, and hence it is difficult to reduce the manufacturing cost of the information processor by this means.

SUMMARY OF THE INVENTION

An object of the present invention is to provide a data transfer control unit which enables reduction of the capacity of a memory part by adjusting the bit width of data transferred between a processing part executing information processing and the memory part accessed by this processing part.

In order to attain the aforementioned object, a data transfer control unit according to the present invention has a bit width control part which controls the bit width of data transferred between a memory part and a processing part executing information processing for matching a first bit width of a port for inputting/outputting the data on the processing part side with a second bit width, which is narrower than the first bit width, of a port for inputting/outputting the data on the memory part side. The bit width control part comprises a first conversion part for converting the bit width of the data to the second bit width in case of data transfer from the processing part to the memory part, and a second conversion part for converting the bit width of the data to the first bit width in case of data transfer from the memory part to the processing part.

According to the data transfer control unit having the aforementioned structure, the bit width of the data inputted in/outputted from the memory part is converted to the second bit width which is narrower than the first bit width of the data on the processing part side in data transfer between the processing part and the memory part, whereby the capacity of the memory part is reduced to (second bit width/first bit width) times as compared with the prior art. Due to such reduction in capacity of the memory part, the cost for a unit or a system which is formed by the processing part, the memory part and the data transfer control unit is reduced.

The first conversion part of the aforementioned data transfer control unit may be formed to perform rightward bit shift processing on the data transferred from the processing part to the memory part for providing the same with the second bit width, while the second conversion part may be formed to perform leftward bit shift processing on the data transferred from the memory part to the processing part for providing the same with the first bit width.

According to the data transfer control unit having the aforementioned structure, the first or second conversion part performs the conversion between the first and second bit widths not by connection fixing the shift amount by hardware but by bit shift processing, whereby the shift amount can be readily changed so that bit width conversion can be flexibly performed at desire.

The first conversion part of the aforementioned data transfer control unit may be so formed as to clip the data transferred from the processing part to the memory part for providing the same with the second bit width, or to round off the data subjected to the rightward bit shift processing for providing the same with the second bit width.

When the data on the processing part side are transferred to the memory part to be written therein, therefore, the write data are previously clipped or rounded off, whereby it is possible to avoid such a trouble that correct arithmetic processing cannot be performed by using partial data, corresponding to the second bit width, in the data on the processing part side having the first bit width.

Another data transfer control unit according to the present invention has a bit width control part which controls the bit width of data transferred between a memory part and a processing part executing information processing for matching a first bit width of a port for inputting/outputting the data on the processing part side with a second bit width, which is narrower than the first bit width, of a port for inputting/outputting the data on the memory part side. The bit width control part is so formed as to convert the bit width of the data to the second bit width on the basis of the data content in case of data transfer from the processing part to the memory part, and to convert the bit width of the data to the first bit width on the basis of the data content in case of data transfer from the memory part to the processing part.

According to this inventive data transfer control unit, therefore, the bit width of the data inputted in/outputted from the memory part is converted to the second bit width which is narrower than the first bit width of the data on the processing part side on the basis of the data content in data transfer between the processing part and the memory part, whereby the capacity of the memory part is reduced to (second bit width/first bit width) times as compared with the prior art. Due to such reduction in capacity of the memory part, the cost for a unit or a system which is formed by the processing part, the memory part and the data transfer control unit is reduced. Further, the bit width conversion can be flexibly performed on the basis of the content of the data to be transferred.

Still another data transfer control unit according to the present invention has a bit width control part which controls the bit width of data transferred between a memory part and a processing part executing information processing for matching a first bit width of a port for inputting/outputting the data on the processing part side with a second bit width, which is narrower than the first bit width, of a port for inputting/outputting the data on the memory part side. The bit width control part is provided with a first bit width control part and a second bit width control part, so that either one of the first and second bit width control parts is selectively activated in data transfer. The first bit width control part converts the bit width of the data to the second bit width in case of data transfer from the processing part to the memory part, while converting the bit width of the data to the first bit width in case of data transfer from the memory part to the processing part. On the other hand, the second bit width control part converts the bit width of the data to the second bit width on the basis of the data content in case of data transfer from the processing part to the memory part, while converting the bit width of the data to the first bit width on the basis of the data content in case of data transfer from the memory part to the processing part.

According to this inventive data transfer control unit, therefore, the bit width of the data inputted in/outputted from the memory part is converted to the second bit width which is narrower than the first bit width of the data on the processing part side in data transfer between the memory part and the processing part, whereby the capacity of the memory part is reduced to (second bit width/first bit width) times as compared with the prior art. Due to such reduction in capacity of the memory part, the cost for a unit or a system which is formed by the processing part, the memory part and the data transfer control unit is reduced. Further, it is possible to arbitrarily select whether or not the bit width conversion is to be performed on the basis of the content of the data to be transferred, thereby enabling bit width conversion which is responsive to the processing content of the processing part.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 illustrates an exemplary structure of a logic circuit of a round-off processor ROUND12 shown in FIG. 6 at (a) to (c);

FIG. 18 illustrates exemplary structures of bi-direct output buffers operating along the algorithm of FIG. 5 for the static data precision conversion processing part shown in FIG. 1 at (a) and (b) respectively;

FIG. 30 illustrates exemplary structures of logic circuits of a bi-direct output buffer coupling a main processing part with the conversion processing part and that coupling the conversion processing part with a memory part at (a) and (b) respectively in case of employing the data precision conversion processing part shown in FIGS. 28 and 29;

DESCRIPTION OF THE PREFERRED EMBODIMENTS

Embodiments of the present invention are now described with reference to the drawings.

In the following description, the term "data precision" indicates the bit width of data, and "data precision conversion processing" indicates processing of converting the bit width of data to a prescribed bit width. Further, "static data precision conversion processing" indicates processing of simply converting the bit width of data to a prescribed bit width regardless of the content of the converted data. "Dynamic data precision conversion processing" makes a data conversion process algorithm different on the basis of the converted data.

As to a plurality of data precision conversion processing parts hereafter described in relation to data precision conversion processing, it is preferable to employ a suitable one on the basis of the processing content or the like.

First, the static data precision conversion processing is described.

Figure 1:
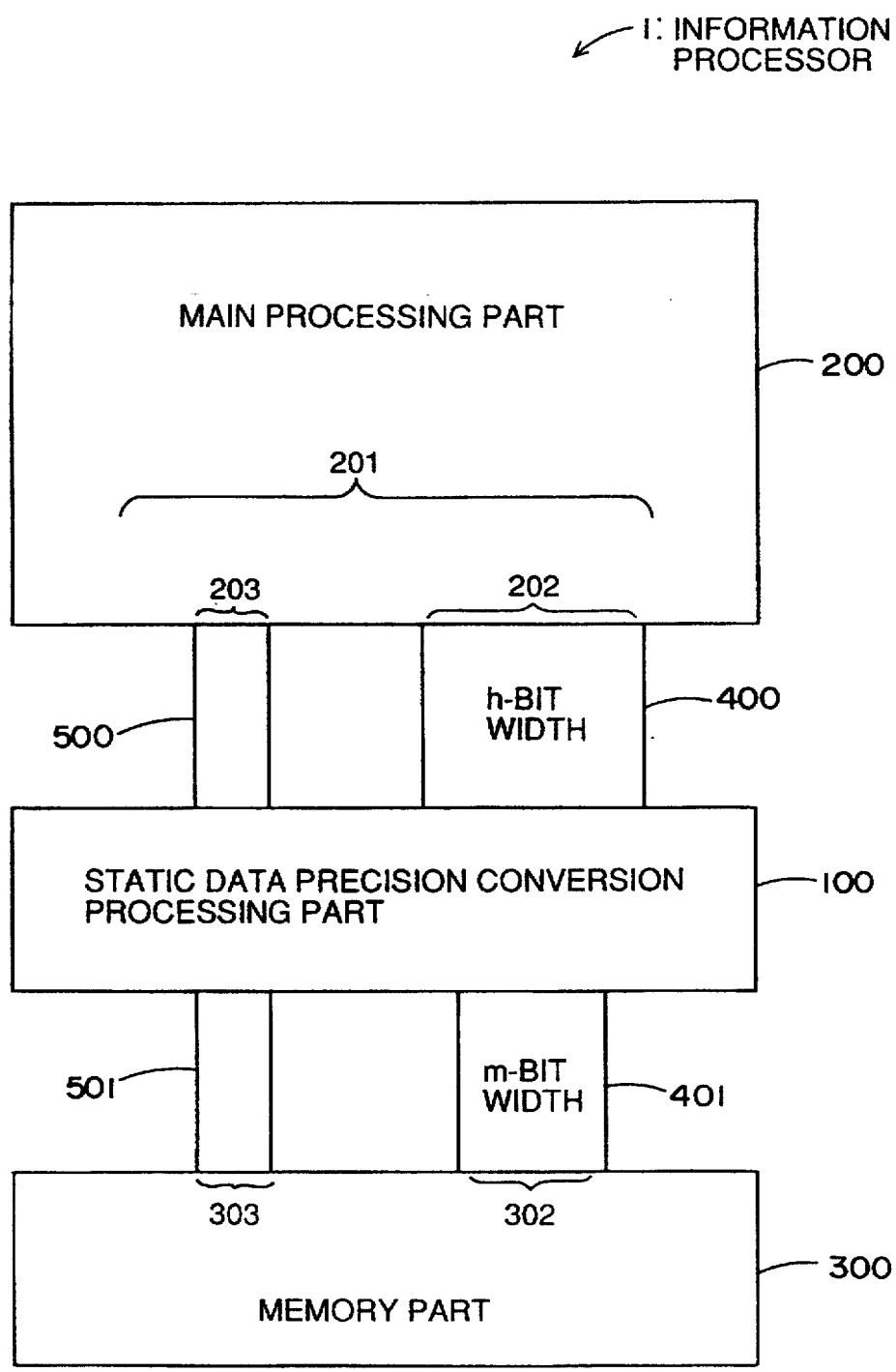
FIG. 1 is a block diagram showing an information processor including a static data precision conversion processing part according to an embodiment of the present invention.

FIG. 1 is a block diagram showing an information processor 1 including a static data precision conversion processing part according to an embodiment of the present invention.

The information processor 1 shown in FIG. 1 includes a static data precision conversion processing part 100, a main processing part 200 performing information processing, a memory part 300 which is accessed by the main processing part 200, data system signal channels 400 and 401 for transmitting data which are written in/read from the memory part 300, and non-data system signal channels 500 and 501 for transmitting address signals, control signals and the like related to the data written in/read from the memory part 300.

Further, the main processing part 200 includes a memory access port 201, and this memory access port 201 includes a non-data system port 203 which is connected with the channel 500 and a data system port 202 of an h-bit width which is connected with the channel 400. On the other hand, the memory part 300 includes a data system port 302 of an m-bit width which is connected with the channel 401, and a non-data system port 303 which is connected with the channel 501.

The main processing part 200 is connected with the data precision conversion processing part 100 by the data system signal channel 400 of the h-bit width and the non-data system signal channel 500, while the static data precision conversion processing part 100 is connected with the memory part 300 by the data system signal channel 401 of the m-bit width and the non-data system signal channel 501, so that the main processing part 200 executes data read/write processing on a memory of the memory part 300 through the static data precision conversion processing part 100.

The process of the static data precision conversion processing part 100 is now described with reference to concrete examples. In each of the following concrete examples, the bit width (h-bit width) of data transferred between the main processing part 200 and the memory part 300 through the static data precision conversion processing part 100 is 12 bits on the side of the main processing part 200, and that (m-bit width) of the data on the side of the memory part 300 is 8 bits. Further, the data transferred between the main processing part 200, the static data precision conversion processing part 100 and the memory part 300 are in two's complement expression.

The static data precision conversion processing part 100 converts 12-bit data received from the main processing part 200 to 8-bit data, i.e., data of a bit width writable in the memory part 300, in a write mode for the memory part 300, while the same converts 8-bit data read from the memory part 300 to 12-bit data, i.e., data of a bit width processible in the main processing part 200, in a read mode from the memory part 300. Thus, it is assumed that the content of the information processing performed in the main processing part 200 is not influenced by data which are subjected to such bit width conversion processing.

Figure 2:
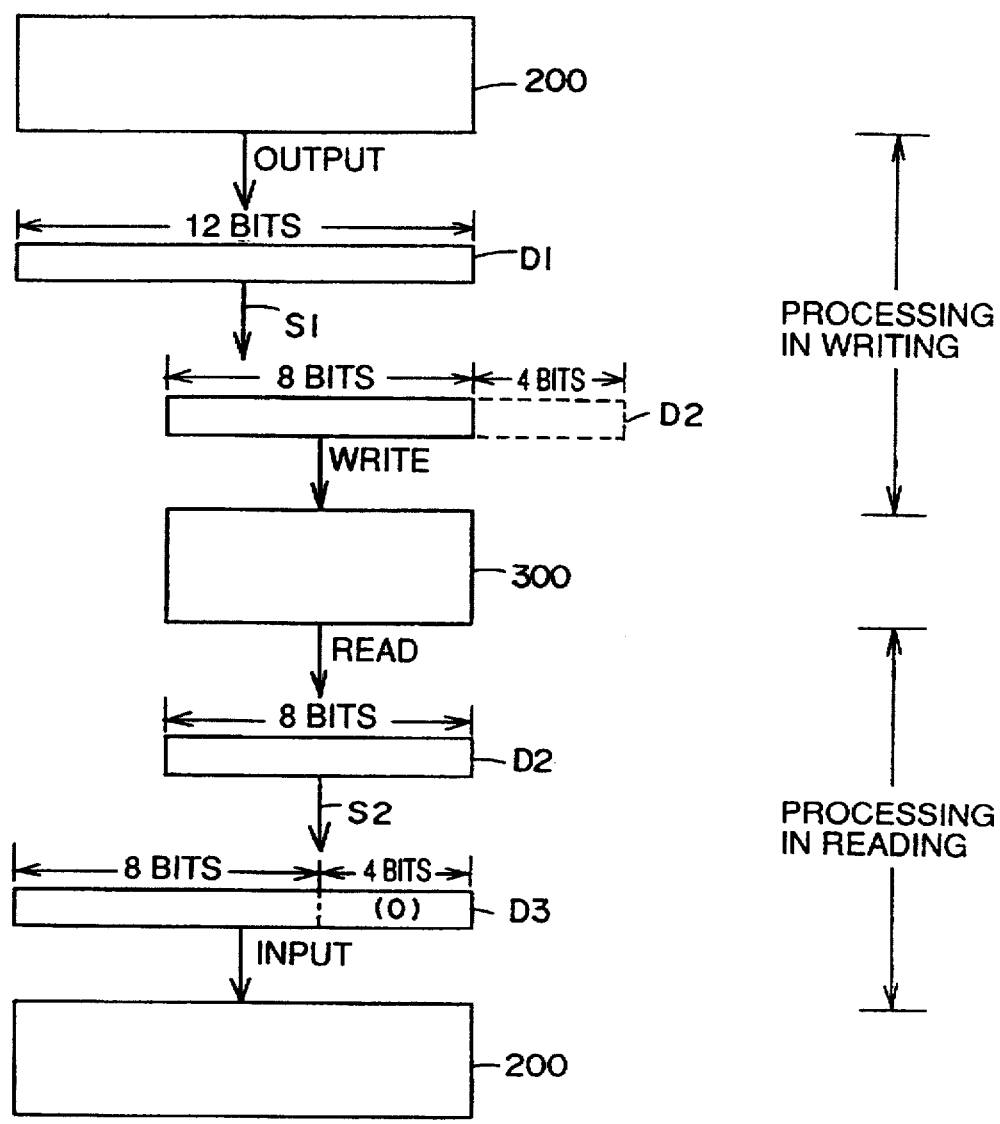
FIG. 2 illustrates a first exemplary process algorithm for the static data precision conversion processing part shown in FIG. 1.

FIG. 2 illustrates a first exemplary process algorithm for the static data precision conversion processing part 100 shown in FIG. 1.

Referring to FIG. 2, 4-bit right-shift processing S1 and 4-bit left-shift processing S2 are employed for writing and reading data in and from the memory part 300 in the static data precision conversion processing part 100 respectively. 12-bit data D1 which is outputted from the main processing part 200 (inputted in the static data precision conversion processing part 100) to be written in the memory part 300 is subjected to the 4-bit right-shift processing S1, to be converted to 8-bit data D2 with truncation of lower 4 bits. This 8-bit data D2 is outputted from the static data precision conversion processing part 100, and written in a region of the memory part 300 corresponding to a prescribed address.

Processing in reading is now described. The 8-bit data D2 read from the memory part 300 (inputted in the static data precision conversion processing part 100) is subjected to the 4-bit left-shift processing S2 to be shifted leftward by four bit positions, and converted to 12-bit data D3 supplied with zeros in respective ones of four lower null bits caused by the shifting. Thereafter the 12-bit data D3 is supplied to the main processing part 200.

Alternatively, the respective ones of the four null bits may be supplied with 1 in the processing S2. Or, the respective ones of the four null bits may be supplied with zeros when the data D2 takes a positive value, while the former may be supplied with 1 when the latter takes a negative value. Such processing of the lower null bits is also applicable to the following examples.

In the aforementioned processing of the lower null bits, it is assumed that any value may be set only when the value of the lower null bits exerts no influence on the subsequent processing, i.e., when the subsequent processing refers to only values of the remaining bits.

Figure 3:
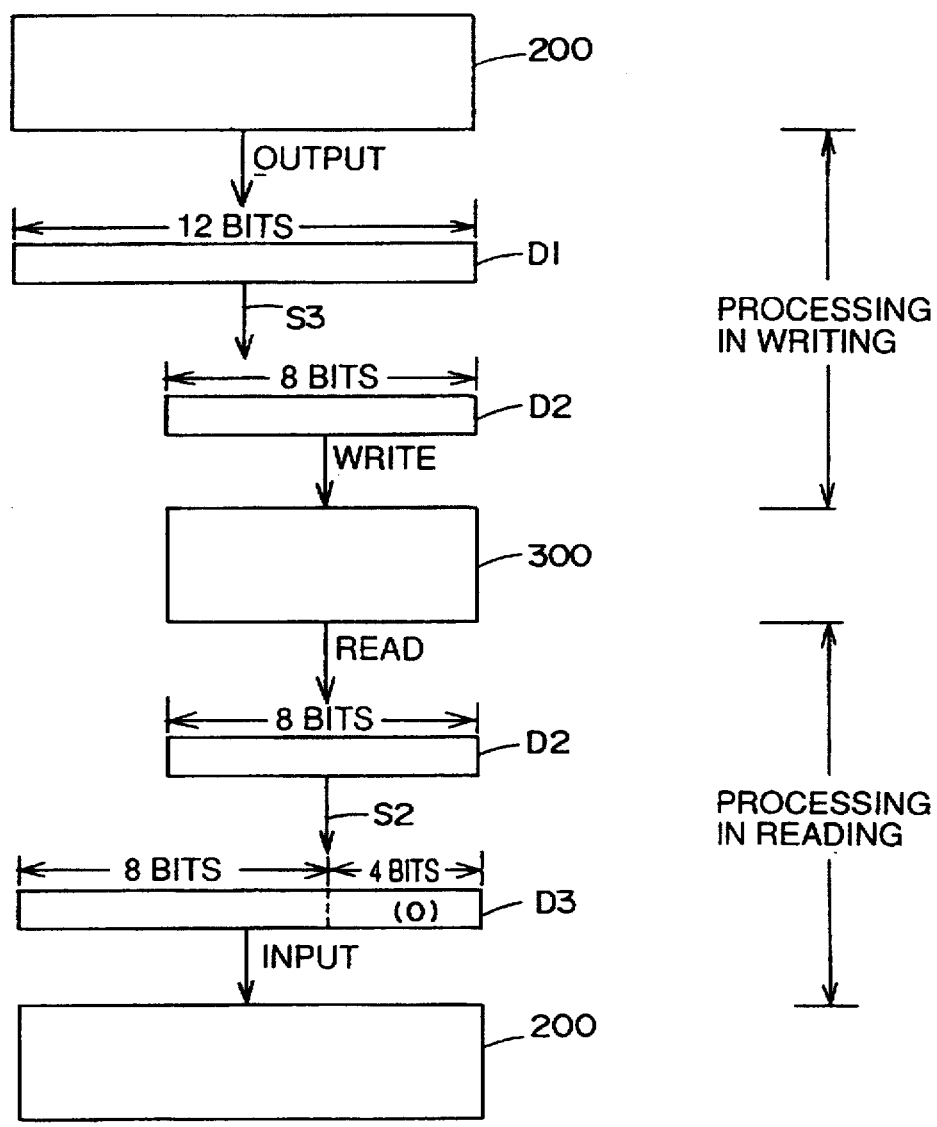
FIG. 3 illustrates a second exemplary process algorithm for the static data precision conversion processing part shown in FIG. 1.

FIG. 3 illustrates a second exemplary process algorithm for the static data precision conversion processing part 100 shown in FIG. 1. Referring to FIG. 3, clipping processing S3 and leftward bit shift processing S2 are employed for data write processing and data read processing with respect to the memory part 300 respectively. The clipping processing is adapted to set a certain arbitrary maximum/minimum value, input data and compare the same with the maximum/minimum value, for replacing the data with the set value when the same is larger/smaller than the maximum/minimum value and outputting the same. In the clipping processing S3, it is assumed that the set maximum value is 127 and the set minimum value is −128. The set maximum/minimum value is matched with the maximum/minimum value of converted 8-bit data.

Referring to FIG. 3, 12-bit data D1 outputted from the main processing part 200 (inputted in the static data precision conversion processing part 100) to be written in the memory part 300 is subjected to the clipping processing S3, to be converted to 8-bit data D2. This 8-bit data D2 is outputted from the static data precision conversion processing part 100, and written in a region of the memory part 300 corresponding to a prescribed address.

Referring to FIG. 3, processing in reading is identical to that in FIG. 2, and hence redundant description is omitted.

Figure 4:
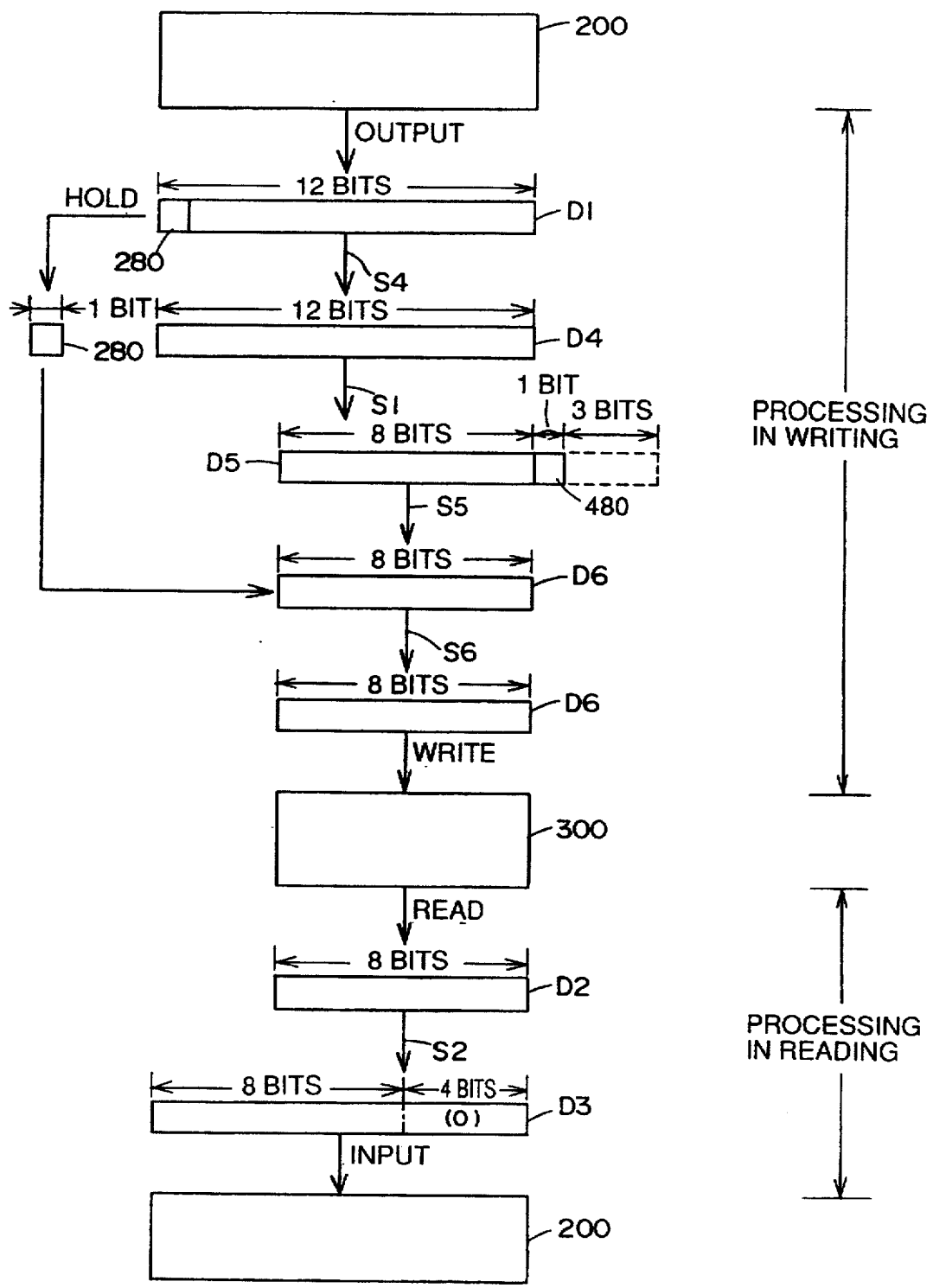
FIG. 4 illustrates a third exemplary process algorithm for the static data precision conversion processing part shown in FIG. 1.

FIG. 4 illustrates a third exemplary process algorithm for the static data precision conversion processing part 100 shown in FIG. 1.

Referring to FIG. 4, the static data precision conversion processing part 100 employs absolute value processing S4, 4-bit right-shift processing S1, round-off processing S5 and processing S6 for returning data to two's complement expression in processing for writing data in the memory part 300, while employing 4-bit left-shift processing S2 is employed in read processing. In the write processing, 12-bit data D1 outputted from the main processing part 200 (inputted in the static data precision conversion processing part 100) to be written in the memory part 300 is subjected to the absolute value processing S4. In this case, a sign bit 280 (the most significant bit of the data D1 is used in general) of the data D1 is held up to execution of the processing S6 for returning data to two's complement expression described later.

12-bit data D4 subjected to the absolute value processing S4 is then subjected to the 4-bit right-shift processing S1. Three lower bits are truncated among four lower bits of the data D4, and the remaining 1-bit data 480 is referred to in the subsequent round-off processing S5.

After the 4-bit right-shift processing S1, data D5 is subjected to the round-off processing S5. In the round-off processing S5, the data D5 is outputted to the subsequent processing as such if the value of the 1-bit data 480 is zero, while the value of the data D5 is incremented by 1 so that the data D5 is thereafter outputted to the subsequent processing when the value of the data 480 is 1.

Data D6 subjected to the round-off processing S5 is subjected to the processing S6 for returning data to two's complement expression on the basis of the value of the sign bit 280. The data D6 is outputted to the subsequent processing part as such if the value of the sign bit 280 is zero since the same has a positive value, while the value of each bit is inverted (set at 1 when the value is zero, and vice versa) and further incremented by 1 so that the data D6 is then outputted to the subsequent processing part if the value of the sign bit 280 is 1 since the data D6 has a negative value. Thus, the 8-bit data D6 subjected to the processing S6 for returning data to two's complement expression is outputted from the static data precision conversion processing part 100 and written in a region of the memory part 300 corresponding to a prescribed address.

Referring to FIG. 4, processing in reading is identical to that in FIG. 2, and hence redundant description is omitted.

Figure 5:
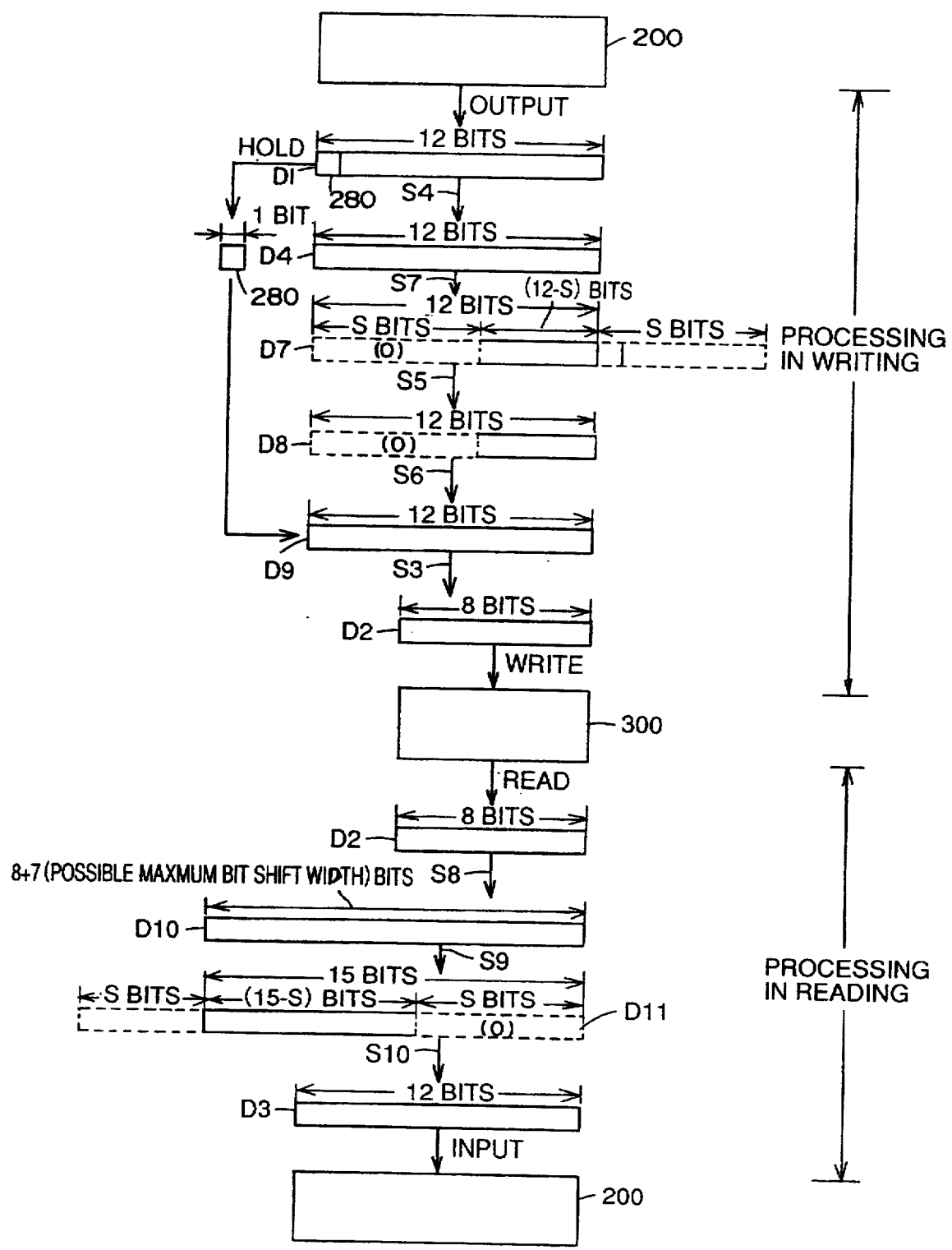
FIG. 5 illustrates a fourth exemplary process algorithm for the static data precision conversion processing part shown in FIG. 1.

FIG. 5 illustrates a fourth exemplary process algorithm for the static data precision conversion processing part 100 shown in FIG. 1.

Referring to FIG. 5, the static data precision conversion processing part 100 employs absolute value processing S4, rightward bit shift processing S7 not fixing its shift amount, round-off processing S5, processing S6 for returning data to two's complement expression and clipping processing S3 in data write processing for the memory part 300, while employing sign extension processing S8, leftward bit shift processing S9 not fixing its shift amount and clipping processing S10 in read processing respectively.

In data write processing for the memory part 300, 12-bit data D1 outputted from the main processing part 200 (inputted in the static data precision conversion processing part 100) to be written in the memory part 300 is subjected to the absolute value processing S4 while holding a sign bit 280. Data D4 obtained through the absolute value processing S4 is subjected to rightward s-bit ($0 \leq s \leq 7$, where s represents a positive number) shift processing S7, and converted to (12-s)-bit data D7. It is assumed here that the rightward bit shift amount s is decided by a rightward bit shift amount signal which is outputted from the main processing part 200 or directly inputted in the static data precision conversion processing part 100.

The data D7 is subjected to the round-off processing S5, to be converted to data D8. Further, the data D8 is returned to two's complement expression by the processing S6 for returning data to two's complement expression, to be converted to data D9. Finally, the data D9 is subjected to the clipping processing S3 (set maximum value: 127, set minimum value: −128) and outputted from the static data precision conversion processing part 100, to be written in a region of the memory part 300 corresponding to a prescribed address.

In data read processing from the memory part 300, 8-bit data D2 read from the memory part 300 is subjected to the sign extension processing S8. The sign extension processing S8 is adapted to extend the sign bit value of the 8-bit data D2 to upper bits of this data, thereby converting the same to 8+7 (possible maximum bit shift width)-bit data D10. The data D10 is subjected to the s-bit left-shift processing S9, to be converted to data D11.

The s-bit left-shift processing S9 is adapted to leftwardly shift the inputted data D10 by the designated s bit positions, while setting zero in each lower bit taking no value due to the shifting. It is assumed here that the leftward bit shift amount s is decided by a leftward bit shift amount signal which is outputted from the main processing part 200 or directly inputted in the static data precision conversion processing part 100.

The data D11 is subjected to the clipping processing S10 (set maximum value: 2047, set minimum value: −2048), to be converted to 12-bit data D3. Finally, the 12-bit data D3 is outputted from the static data precision conversion processing part 100, and loaded in the main processing part 200.

Figure 6:
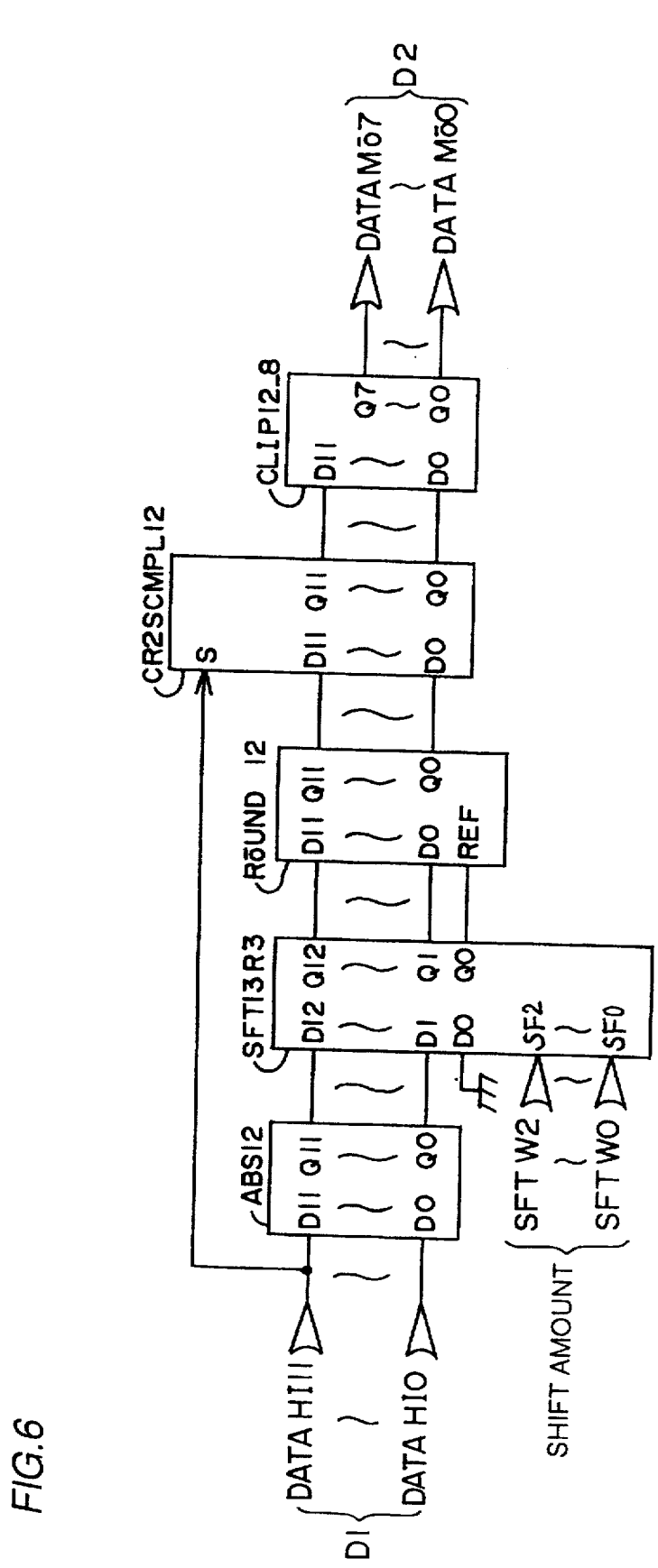
FIG. 6 illustrates an exemplary structure of a logic circuit related to data write processing along the process algorithm of FIG. 5 for the static data precision conversion processing part shown in FIG. 1.

FIG. 6 illustrates an exemplary structure of a logic circuit related to data write processing along the process algorithm of FIG. 5 for the static data precision conversion processing part 100 shown in FIG. 1.

Referring to FIG. 6, the logic circuit of the processing part 100 is formed by series-connecting an absolute value generation circuit ABS12 for the absolute value processing S4, a shift processor SFT13R3 for the s-bit right-shift processing S7 employing 3-bit shift amount signals SF0 to SF2, a round-off processor ROUND12 for the round-off processing S5, a two's complement generation circuit CR2SCMPL12 for the processing S6 for returning data to two's complement expression, and a clipping processor CLIP12_8 for the clipping processing S3 with each other in relation to the data write processing shown in FIG. 5 along processing order.

Figure 7:
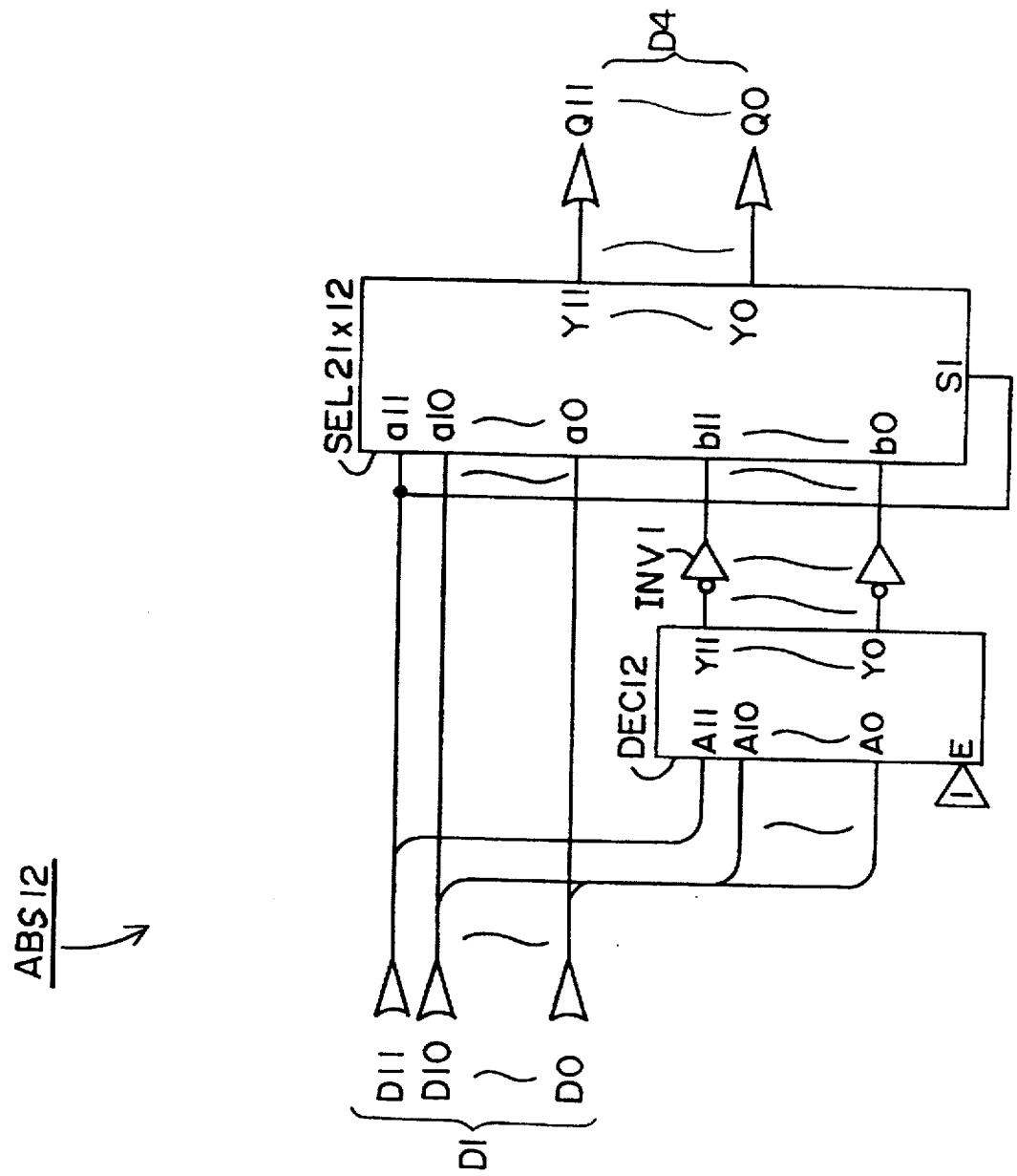
FIG. 7 illustrates an exemplary structure of a logic circuit of an absolute value generation circuit ABS12 shown in FIG. 6.

The respective circuits shown in FIG. 6 are now described with reference to FIGS. 7 to 14. FIG. 7 shows the circuit structure of the absolute value generation circuit ABS12. The absolute value generation circuit ABS12 includes a subtracter DEC12, a plurality of invertors INV1 provided for respective bits of processed data and a selector SEL21x12. The selector SEL21x12 has input terminals a0 to a11 and b0 to b11 and output terminals Y0 to Y11. The input terminals a0 to a11 are supplied with values of respective bits of input data in the absolute value generation circuit ABS12, while output values of the output terminals Y0 to Y11 are output data of the absolute value generation circuit ABS12. When the input data has a negative number (the sign bit (11-th bit) of the input data is 1), the absolute value generation circuit ABS12 finds the absolute value of this input data. Namely, 1 is subtracted from negative number input data in two's complement expression in the subtracter DEC12, so that each bit of the data is thereafter inverted in the corresponding invertor INV1. Then, the selector SEL21x12 derives data of the input terminals a0 to a11 to the output terminals Y0 to Y11 when a sign bit value S1 of the input data is 0 while deriving data of the input terminals b0 to b11 when the sign bit value S1 is 1 on the basis of the sign bit value S1, whereby input data of a positive number is through-processed.

Figure 8:
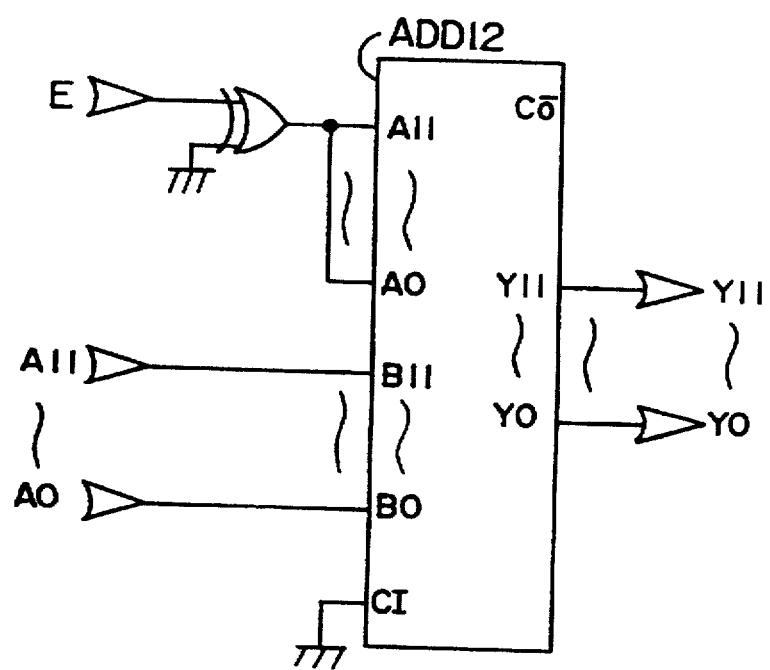
FIG. 8 illustrates an exemplary structure of a logic circuit of a subtracter DEC12 shown in FIG. 7.

FIG. 8 illustrates the circuit structure of the subtracter DEC12 shown in FIG. 7. Referring to FIG. 8, the subtracter DEC12 includes an adder ADD12.

Figure 9:
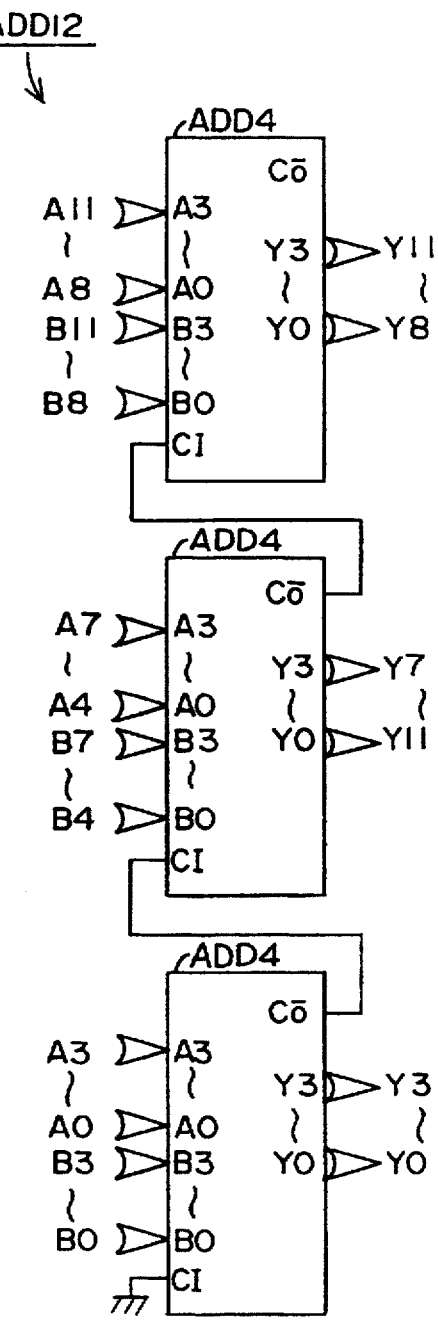
FIG. 9 illustrates an exemplary structure of a logic circuit of an adder ADD12 shown in FIG. 8.

FIG. 9 illustrates an exemplary circuit structure of the adder ADD12 shown in FIG. 8. Referring to FIG. 9, the adder ADD12 includes three adders ADD4.

Figure 10:
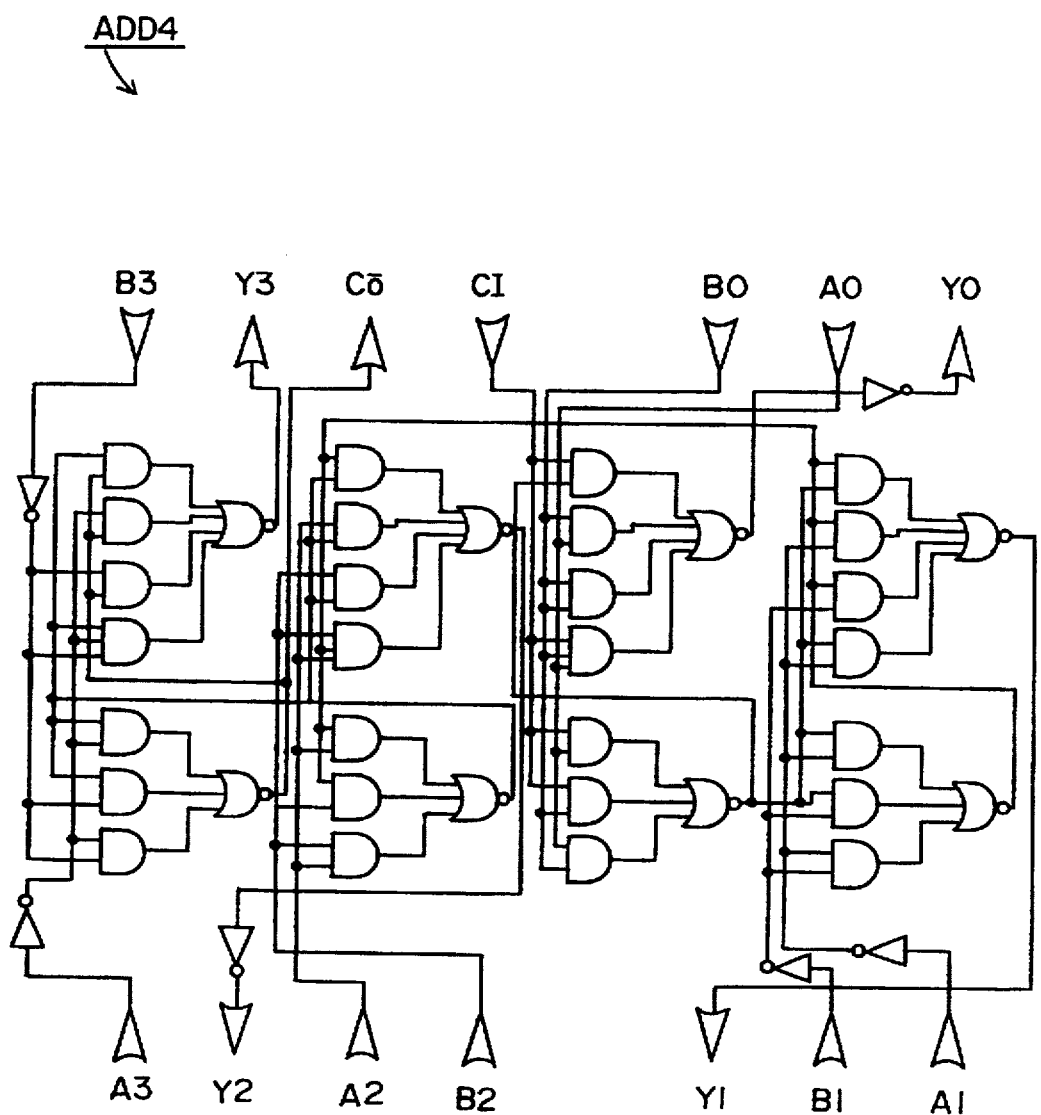
FIG. 10 illustrates an exemplary structure of a logic circuit of an adder ADD4 shown in FIG. 9.

FIG. 10 illustrates an exemplary circuit structure of each adder ADD4 shown in FIG. 9.

Figure 11:
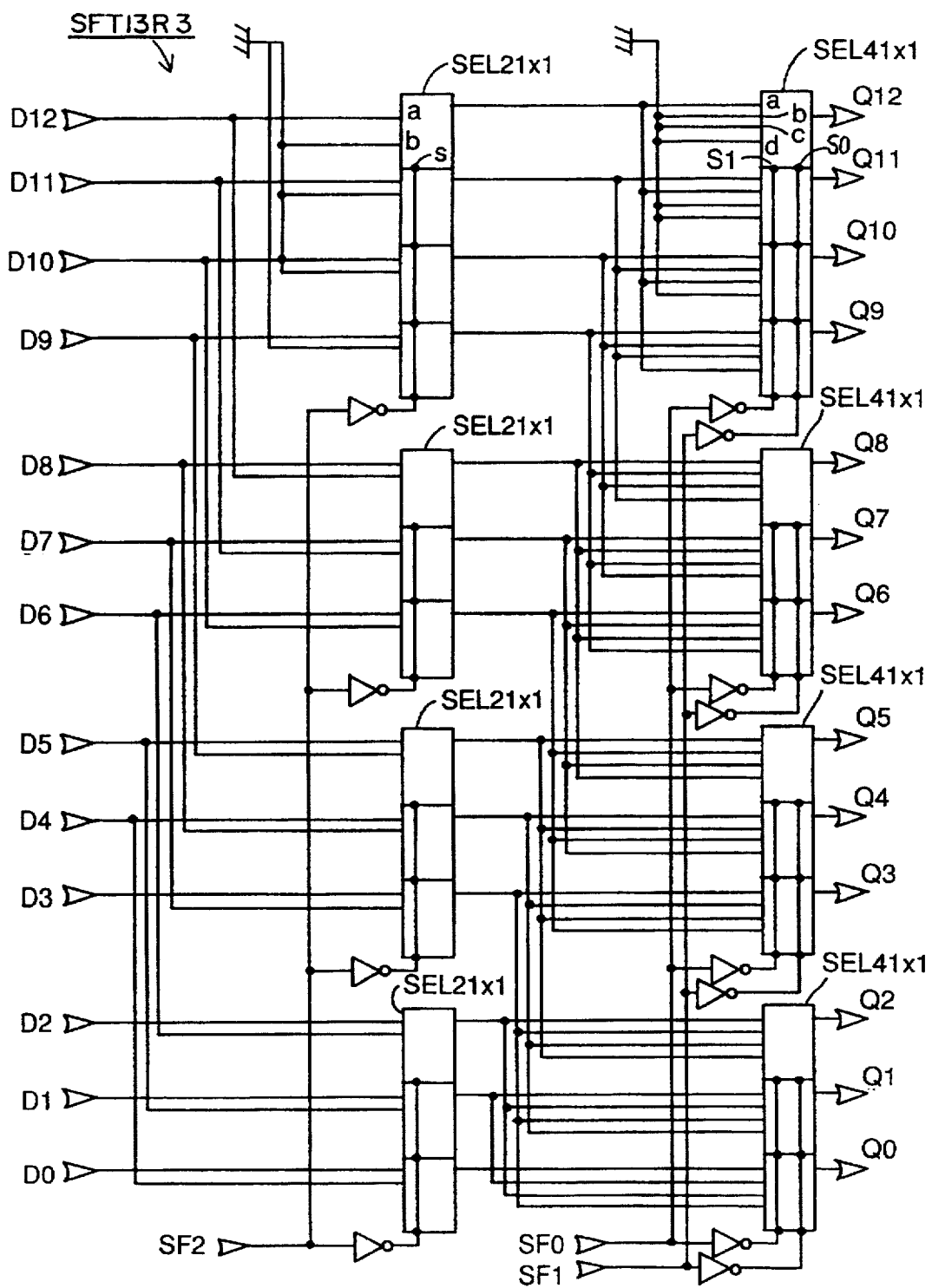
FIG. 11 illustrates an exemplary structure of a logic circuit of a shift processor SFT13R3 shown in FIG. 6.

FIG. 11 illustrates an exemplary circuit structure of the shift processor SFT13R3 shown in FIG. 6. Referring to FIG. 11, the shift processor SFT13R3 includes a plurality of circuits SEL21x1 and a plurality of circuits SEL41x1. Each circuit SEL21x1 selects and outputs an input value of a terminal a when that of a terminal S (signal SF2) is zero, while selecting and outputting an input value of a terminal b when that of the terminal S is 1. On the other hand, each circuit SEL41x1 selects and outputs input values of terminals a, b, c and d when input values of terminals S0 and S1 by 2-bit signals SF1 and SF0 are zero, 1, 2 and 3 respectively. Thus, the shift processor SFT13R3 derives values obtained by logically rightwardly shifting input data consisting of input bit values D12 to D0 in response to values of rightward bit shift amount signals SF2 to SF0 in a rightward shift system of supplying zero to upper null bits resulting from rightward shifting respectively as output data consisting of output bit values Q12 to Q0.

FIG. 12 illustrates an exemplary circuit structure of the round-off processor ROUND12 shown in FIG. 6 at (a) to (c). Referring to (a) in FIG. 12, the round-off processor ROUND12 includes a circuit INC12 shown at (b) in FIG. 12, for incrementing and outputting input data D11 to D0 when the value of an input REF is 1 while outputting the input data D11 to D0 with no processing (with through processing) when the value of the input REF is zero. The circuit INC12 further includes three circuits INC4B shown at (c) in FIG. 12.

Figure 13:
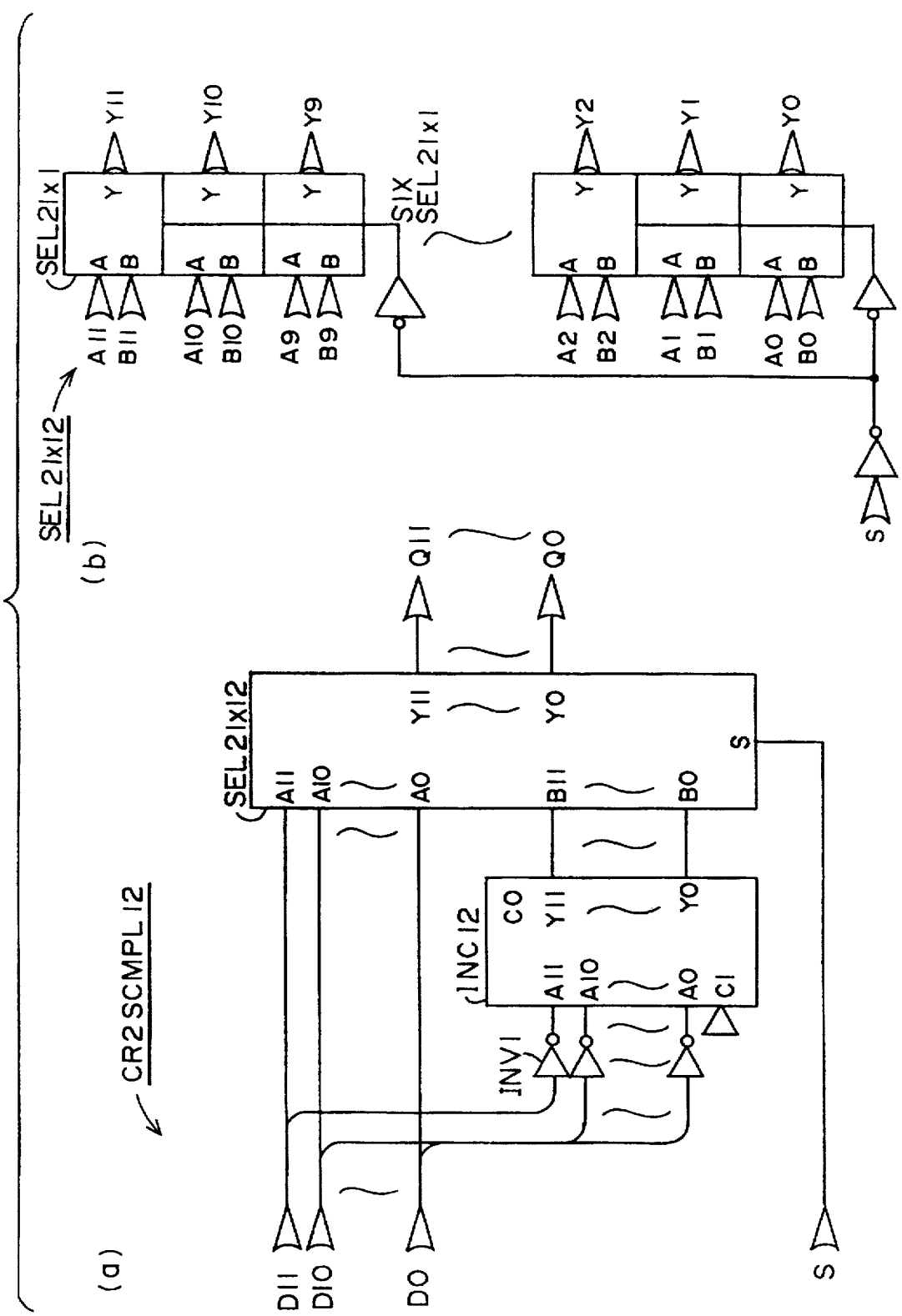
FIG. 13 illustrates an exemplary structure of a two's complement generation circuit CR2SCMPL12 shown in FIG. 6 at (a) and (b)

FIG. 13 shows an exemplary circuit structure of the two's complement generation circuit CR2SCMPL12 shown in FIG. 6 at (a) and (b). Referring to (a) in FIG. 13, the two's complement generation circuit CR2SCMPL12 includes a plurality of bit invertors INV1 which are provided in correspondence to respective bits of input data, an incrementer INC12 and a selector SEL21x12 shown at (b) in FIG. 13. The selector SEL21x12 selects and outputs data obtained by inverting the respective bits of the input data D11 to D0 by the invertors INV1 and incrementing the same by 1 by the incrementer INC12 when an input S is 1, i.e., when the input data are negative numbers, while through-processing and outputting the input data when the input S is zero, i.e., when the input data are positive numbers.

Figure 14:
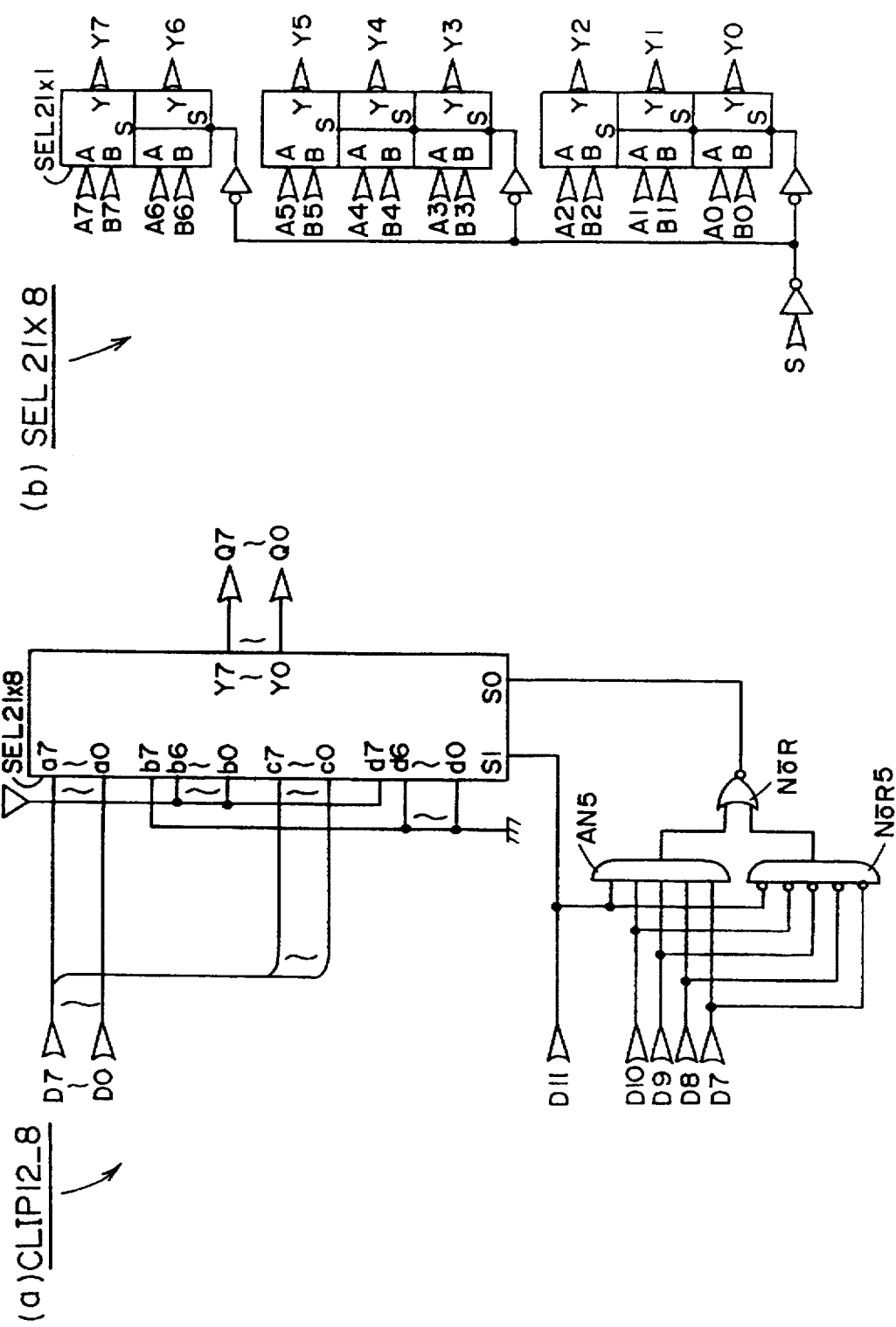
FIG. 14 illustrates an exemplary structure of a clipping processor CLIP12_8 shown in FIG. 6 at (a) and (b)

FIG. 14 illustrates an exemplary circuit structure of the clipping processor CLIP12_8 shown in FIG. 6 at (a) and (b). Referring to (a) in FIG. 14, the clipping processor CLIP12_8 includes a selector SEL21x8 shown at (b) in FIG. 14, an AND gate AN5 and NOR gates NOR5 and NOR.

In operation, the selector SEL21x8 is supplied with values 1 in its terminals S1 and S0 respectively and outputs −128 from terminals Y0 to Y7 as output values when the AND gate AN5 detects that the input data are smaller than the set minimum value −128. On the other hand, the selector SEL21x8 is supplied with values 0 and 1 in the terminals S1 and S0 respectively and outputs 127 from the terminals Y0 to Y7 as output values when the NOR gate NOR5 detects that the input data are larger than the set maximum value 127, while the same through-processes the input data and outputs the same from the terminals Y0 to Y7 when the input data has a value between the set maximum value 127 and the set minimum value −128. In such through processing, both of the terminals S0 and S1 are supplied with values 0 when the input data are positive numbers, while the former are supplied with values 0 and 1 respectively when the latter are negative numbers.

Figure 15:
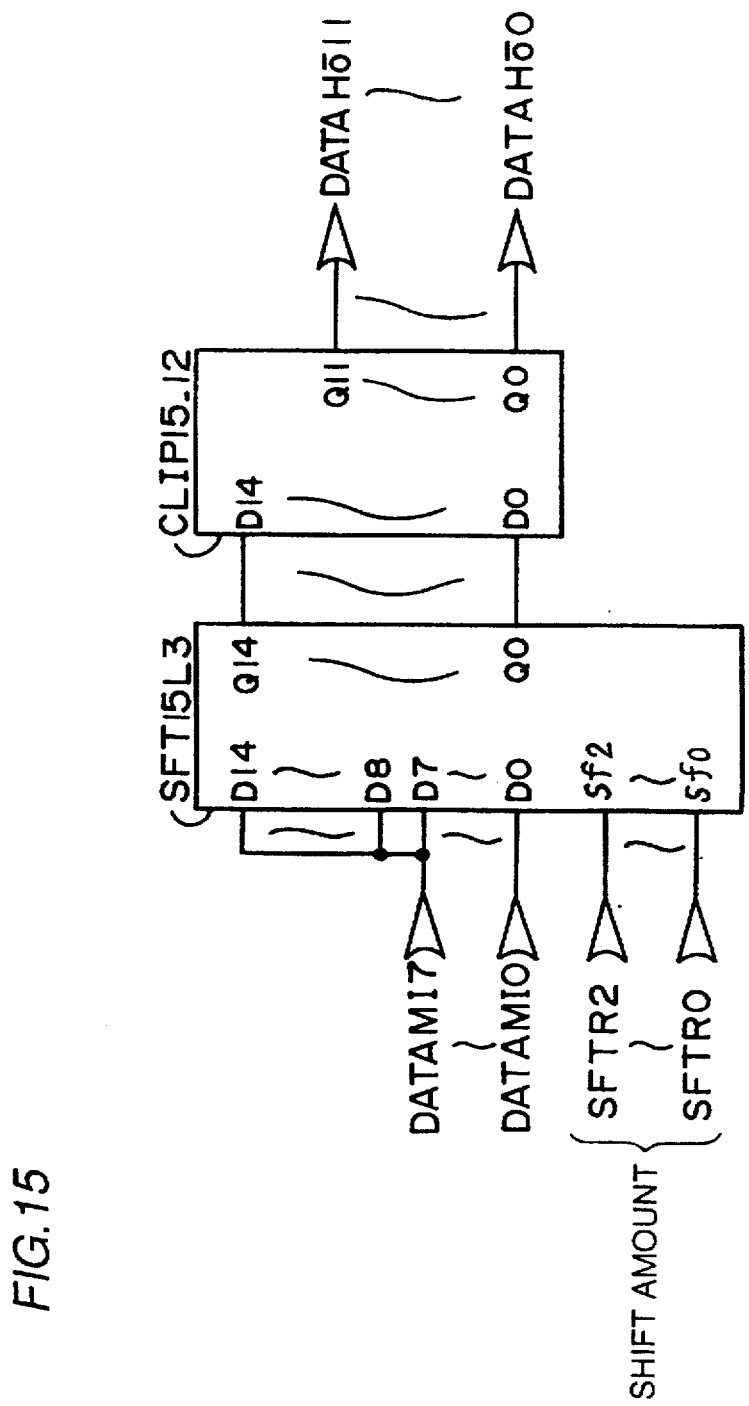
FIG. 15 illustrates an exemplary structure of a logic circuit related to data read processing along the algorithm of FIG. 5 for the static data precision conversion processing part shown in FIG. 1.

FIG. 15 illustrates an exemplary structure of a logic circuit related to data read processing along the process algorithm of FIG. 5 for the static data precision conversion processing part 100.

Referring to FIG. 15, the logic circuit of the processing part 100 is formed by series-connecting a shift processor SFT15L3 for the sign extension processing S8 and the leftward bit shift processing S9 employing 3-bit shift amount signals Sf2 to Sf0 and a clipping processor CLIP15_12 for the clipping processing S10 with each other in relation to the read processing shown in FIG. 5.

The respective circuits shown in FIG. 15 are now described with reference to FIGS. 16 and 17.

Figure 16:
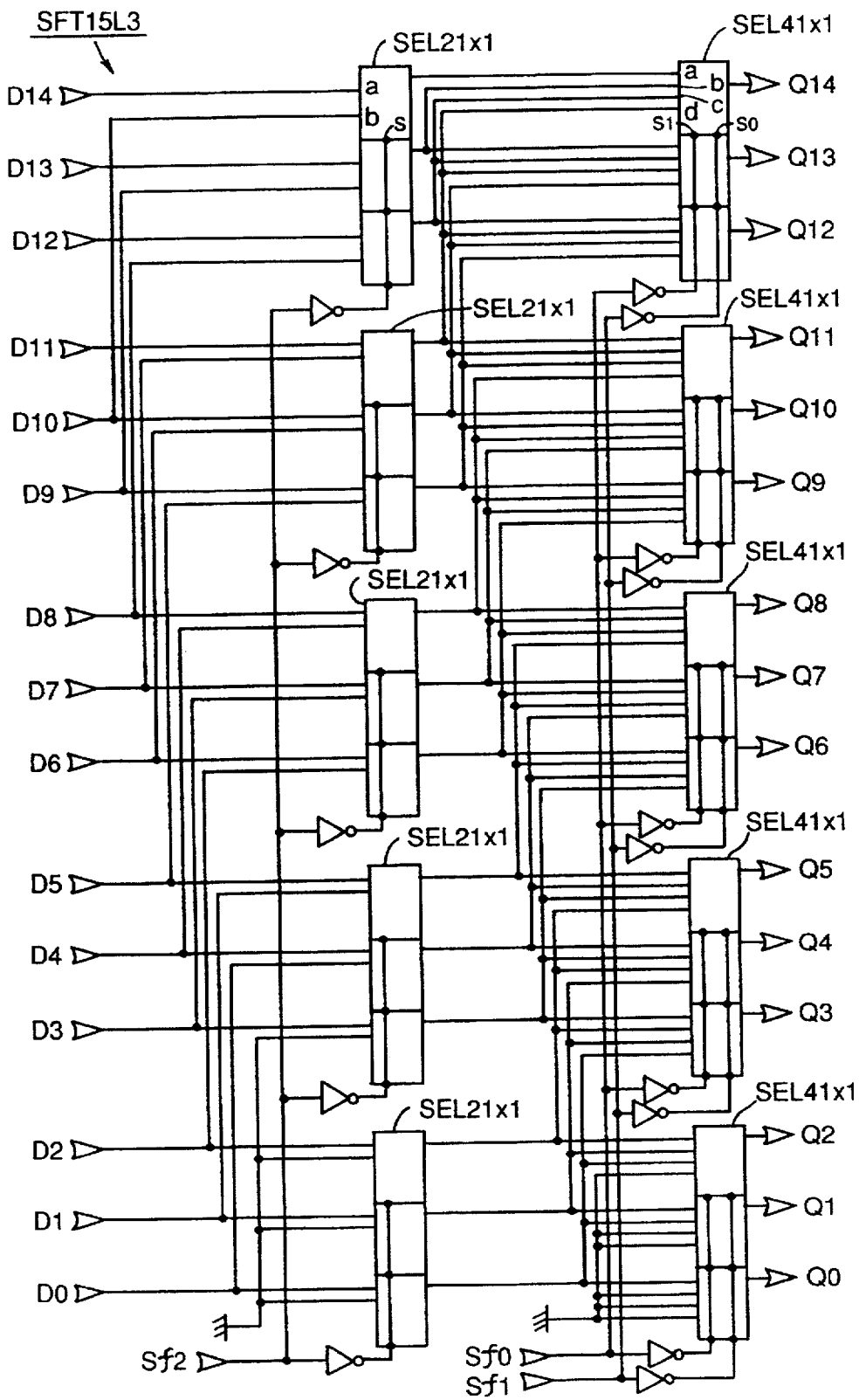
FIG. 16 illustrates an exemplary structure of a logic circuit of a shift processor SFT15L3 shown in FIG. 15.

FIG. 16 illustrates an exemplary logic circuit structure of the shift processor SFT15L3. The shift processor SFT15L3 includes five selectors SEL21x1 and five selectors SEL41x1, and outputs values leftwardly shifted in response to the values of the 3-bit signals Sf0 to Sf2 deciding the leftward bit shift amounts of bits D14 to D0 of input data at bits Q14 to Q0 of output data. Zeros are set in lower null bits resulting from this leftward shifting respectively.

Each selector SEL21x1 selects and outputs the value at an input terminal a when an input value (signal Sf2) of a terminal S is zero, while selecting and outputting the value at an input terminal b when the input value is 1. On the other hand, each selector SEL41x1 selects and outputs values at an input terminal a, an input terminal b, an input terminal c and an input terminal d when an input value (value by the signals Sf0 and Sf1) by terminals S1 and S0 is zero, 1, 2 and 3 respectively.

Figure 17:
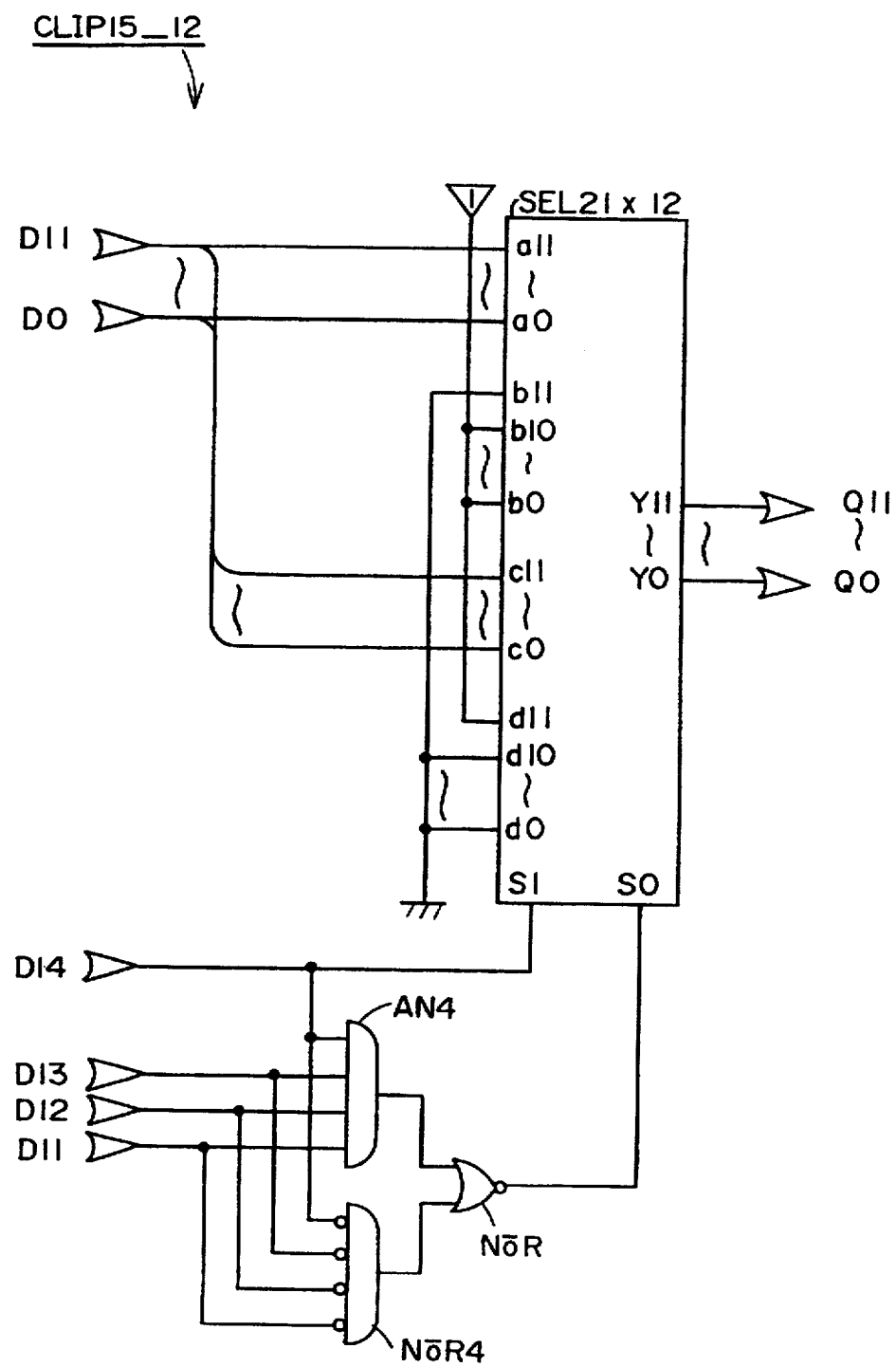
FIG. 17 illustrates an exemplary structure of a logic circuit of a clipping processor CLIP15_12 shown in FIG. 15.

FIG. 17 illustrates an exemplary circuit structure of the clipping processor CLIP15_12. Referring to FIG. 17, the clipping processor CLIP15_12 includes a selector SEL21x12, an AND gate AN4, and NOR gates NOR and NOR4.

In operation, the selector SEL21x12 is supplied with values 1 in its terminals S1 and S0 and outputs a value −2048 through terminals Y0 to Y11 when the AND gate AN4 detects that input data are smaller than a set minimum value −2048. On the other hand, the selector SEL21x12 is supplied with zero and 1 in the terminals S1 and S0 respectively and outputs a value 2047 through the terminals Y0 to Y11 when the NOR gate NOR4 detects that the input data are larger than a set maximum value 2047, while the same performs through processing when the input data are at values between the set minimum value and the set maximum value. In this through processing, both of the terminals S1 and S0 are supplied with zeros when the input data are positive values, while the terminals S1 and S0 are supplied with 1 and zero respectively when the input data are negative numbers.

FIG. 18 illustrates exemplary structures of logic circuits of bi-direct output buffers which operate along the algorithm of FIG. 5 for the static data precision conversion processing part 100 shown in FIG. 1 at (a) and (b) respectively. The bi-direct output buffer shown at (a) in FIG. 18 connects the main processing part 200 with the processing part 100, while that shown at (b) connects the processing part 100 with the memory part 300 respectively.

Referring to FIG. 18, the data transmission direction in each bi-direct output buffer is uniquely decided by the signal level of a write enable signal WE. In more detail, the bi-direct output buffer operates as a transmission buffer of a read mode when the write enable signal WE is at a level 0, while the former operates as a transmission buffer of a write mode when the latter is at a level 1.

As described above, precision of the data written in/read from the memory part 300 can be selected in response to the shift amount of bit shifting by the static data precision conversion processing part 100, while the bit width of the data stored in the used memory part 300 can also be selected.

While the circuits shown in FIGS. 6 and 15 use different shift amounts (SFTW2 to SFTW0 and SFTR2 to SFTR0) as to respective ones of writing/reading for the memory part 300, the same value may alternatively be supplied to both cases.

Dynamic data precision conversion processing is now described.

Figure 19:
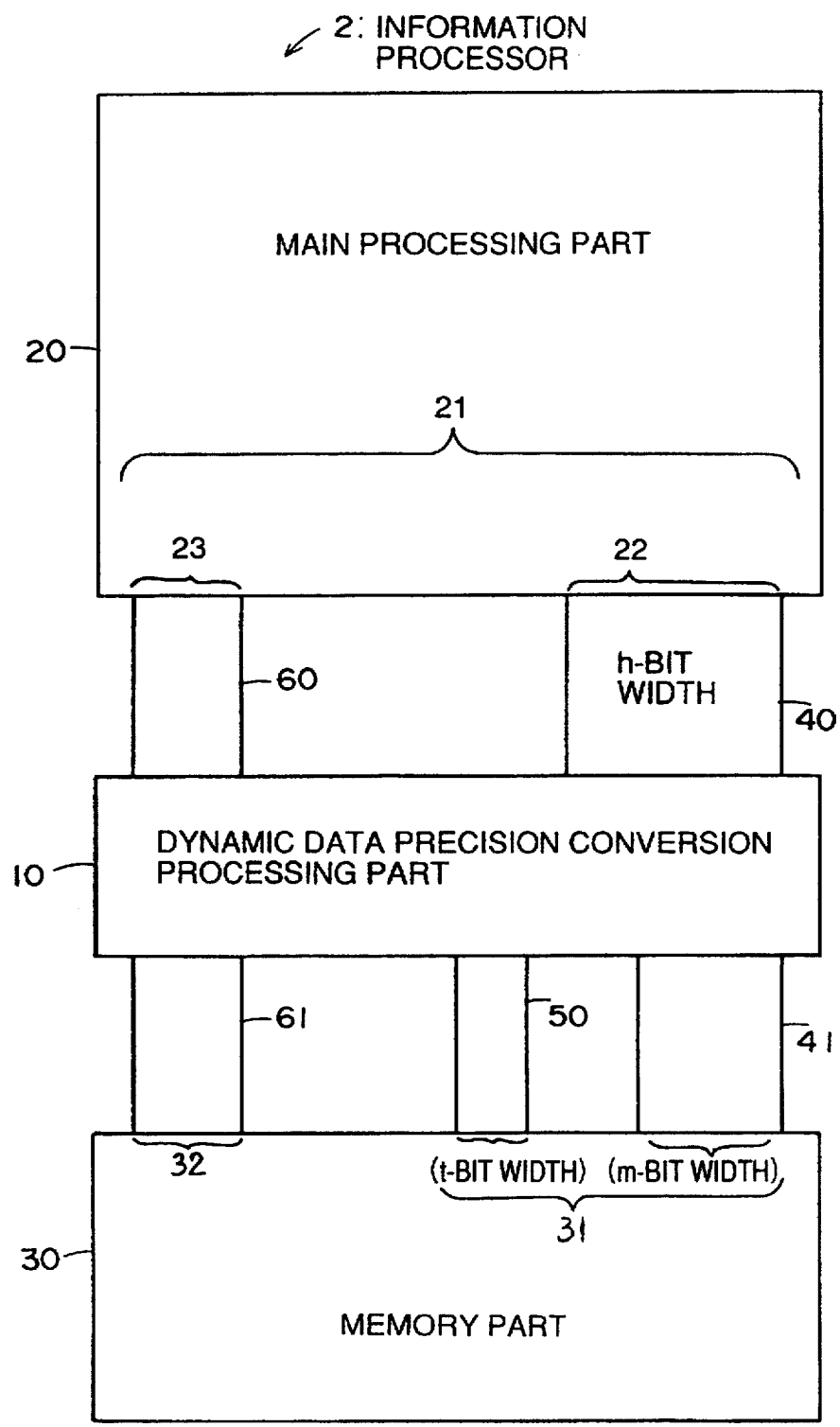
FIG. 19 is a block diagram showing an information processor including a dynamic data precision conversion processing part according to another embodiment of the present invention.

FIG. 19 is a block diagram showing an information processor 2 including a dynamic data precision conversion processing part according to another embodiment of the present invention. Referring to FIG. 19, the information processor 2 includes a dynamic data precision conversion processing part 10, a main processing part 20 performing information processing, a memory part 30 which is accessed by the main processing part 20, data system signal channels 40 and 41 for transmitting data written in/read from the memory part 30, a tag signal channel 50 for transmitting tag information related to the data transmitted by the channel 41, and non-data system signal channels 60 and 61 for transmitting address signals, control signals and the like related to the data written in/read from the memory part 30.

The main processing part 20 includes a memory access port 21 for accessing the memory part 30, and the port 21 includes a data system port 22 (h-bit width=12 bits) which is connected with the channel 40 and a non-data system port 23 which is connected with the channel 60. On the other hand, the memory part 30 includes a data system port 31 and a non-data system port 32 which is connected with the channel 61, and the data system port 31 includes a port of an m-bit width which is connected with the channel 41, and a port of a t-bit width which is connected with the channel 50.

Referring to FIG. 19, the main processing part 20 is connected with the dynamic data precision conversion processing part 10 through the data system signal channel 40 of the h-bit width and the non-data system signal channel 60, while the dynamic data precision conversion processing part 10 is connected with the memory part 30 through the data system signal channel 41 of the m-bit width, the tag signal channel 50 of the t-bit width and the non-data system signal channel 61, so that the main processing part 20 executes data write/read processing for the memory part 30 through the dynamic data precision conversion processing part 10.

The processing of the dynamic data precision conversion processing part 10 is now described.

The dynamic data precision conversion processing part 10 converts 12-bit data from the main processing part 20 to 8-bit data having a tag value, i.e., to the bit width of data writable in the memory part 30, in a write mode for the memory part 30, while converting 8-bit data read from the memory part 30 to 12-bit data, i.e., the bit width of data processible in the main processing part 20, in a read mode from the memory part 30. Thus, it is assumed that the information processing content in the main processing part 20 is uninfluenced even if the data are subjected to such bit width conversion processing.

Figure 20:
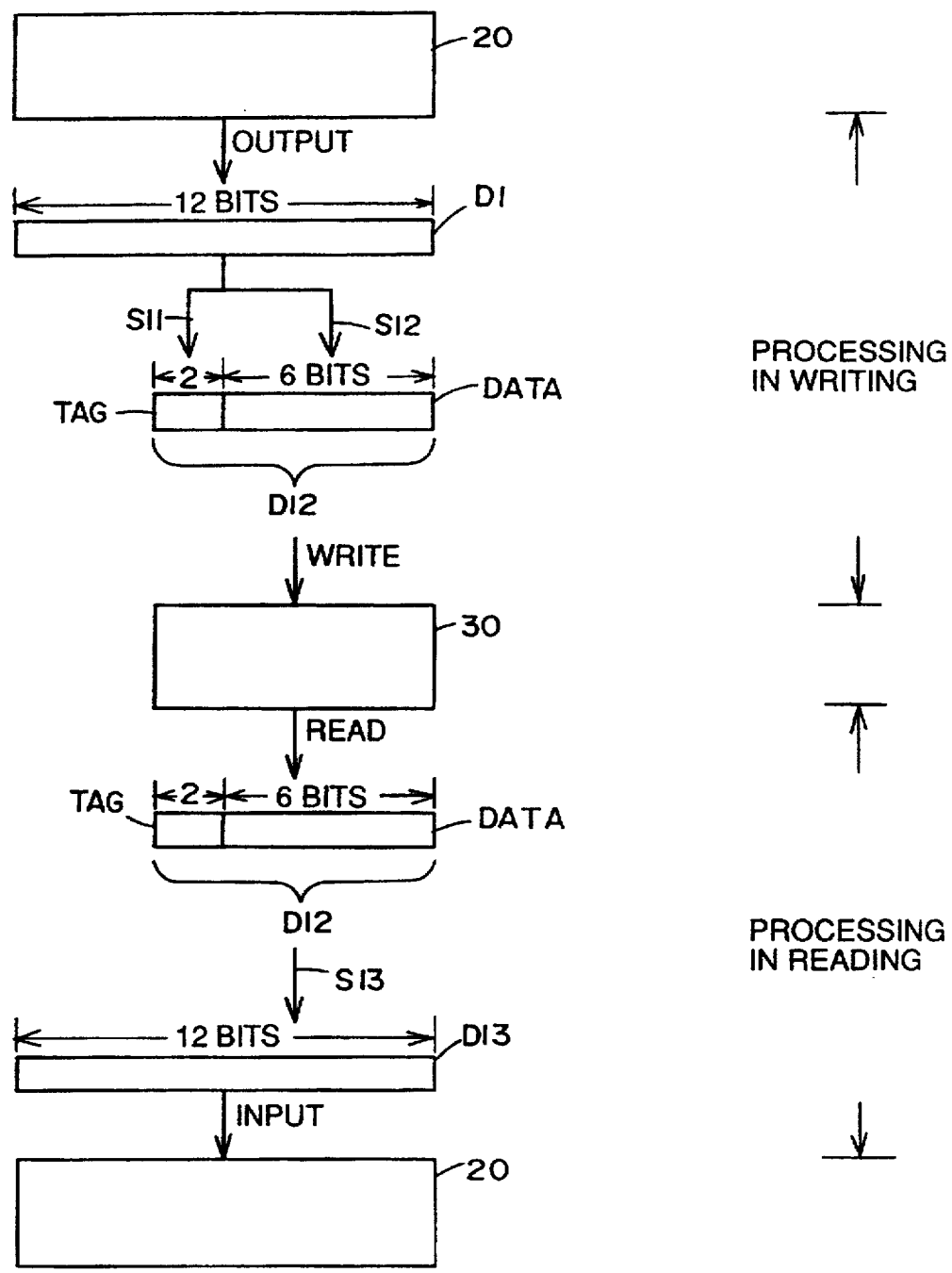
FIG. 20 illustrates an exemplary process algorithm for the dynamic data precision conversion processing part shown in FIG. 19.

FIG. 20 illustrates an exemplary process algorithm for the dynamic data precision conversion processing part 10 shown in FIG. 19. Referring to FIG. 20, the main processing part 20 side bit width (h-bit width in FIG. 19) of data transferred between the main processing part 20 and the memory part 30 through the dynamic data precision conversion processing part 10 is 12 bits, the memory part 30 side bit width (m-bit width in FIG. 19) is 6 bits, and the bit width of a tag signal (t-bit width in FIG. 19) is 2 bits. Further, data transferred between the main processing part 20, the dynamic data precision conversion processing part 10 and the memory part 30 are in two's complement expression.

Description is now made on processing for writing data from the main processing part 20 in the memory part 30. 12-bit data D1 outputted from the main processing part 20 (inputted in the dynamic data precision conversion processing part 10) to be written in the memory part 30 is subjected to data region selection processing S12 in writing in the memory part 30 and tag value generation processing S11, to be converted to 8-bit data D12 consisting of a 2-bit tag value TAG and 6-bit data DATA.

The processing contents of the tag value generation processing S11 and the write data region selection processing S12 are now described with reference to (a) to (d) in FIG. 21.

Figure 21:
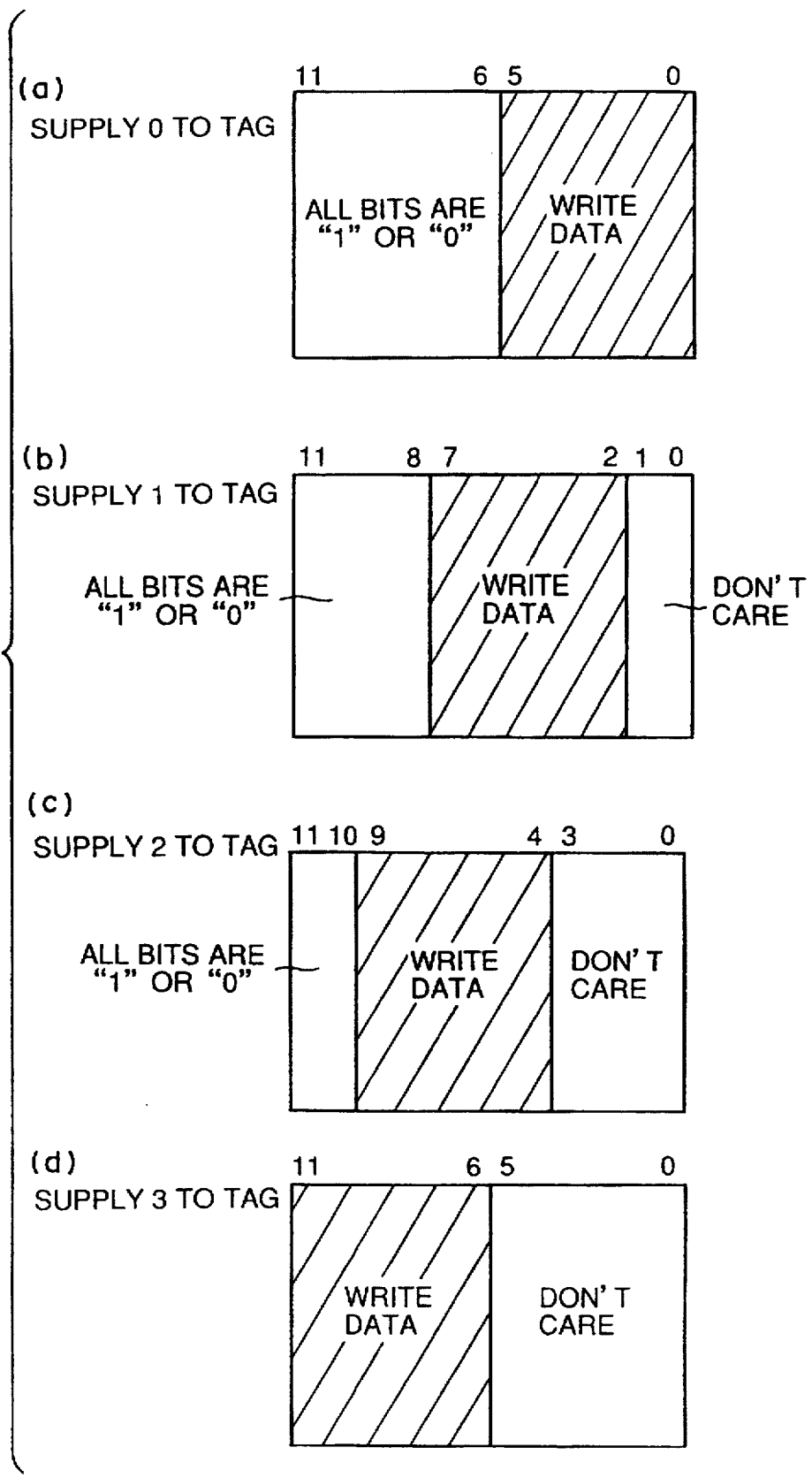
FIG. 21 is adapted to illustrate write data region selection processing in a write mode along the process algorithm shown in FIG. 20 at (a) to (d)

FIG. 21 is adapted to illustrate the write data region selection processing S12 in a write mode along the process algorithm shown in FIG. 20 at (a) to (d). The 12-bit data D1 is classified as shown at (a) to (d) in FIG. 21 on the basis of its internal bit value structure, and supplied with a tag value. When all of 11th to sixth bits of the data D1 are zero or 1, a value zero is supplied to the data D12 as the tag value TAG, fifth to zeroth bits of the data D1 are supplied as the data DATA, and the data D12 is written in the memory part 30, as shown at (a) in FIG. 21.

When all of the 11th to eighth bits of the data D1 are zero or 1, 1 is supplied to the data D12 as the tag value TAG, seventh to second bits of the data D1 are supplied as the data DATA, and the data D12 is written in the memory part 30, as shown at (b) in FIG. 21.

When the 11th and tenth bits of the data D1 are zero or 1, 2 is supplied to the data D12 as the tag value TAG, ninth to fourth bits of the data D1 are supplied as the data DATA, and the data D12 is written in the memory part 30, as shown at (c) in FIG. 21.

If all conditions at (a) to (c) in FIG. 21 are not satisfied, 3 is supplied to the data D12 as the tag value TAG, the 11th to sixth bits of the data D1 are supplied as the data DATA, and the data D12 is written in the memory part 30, as shown at (d) in FIG. 21.

Description is now made on processing of the main processing part 10 for reading data from the memory part 30. 8-bit data D12 read and outputted from the memory part 30 (inputted in the dynamic data precision conversion processing part 10) is subjected to bit width conversion processing S13. This bit width conversion processing S13 is described with reference to FIG. 22 for illustrating read data region selection processing in a read mode along the process algorithm shown in FIG. 20, at (a) to (d).

Figure 22:
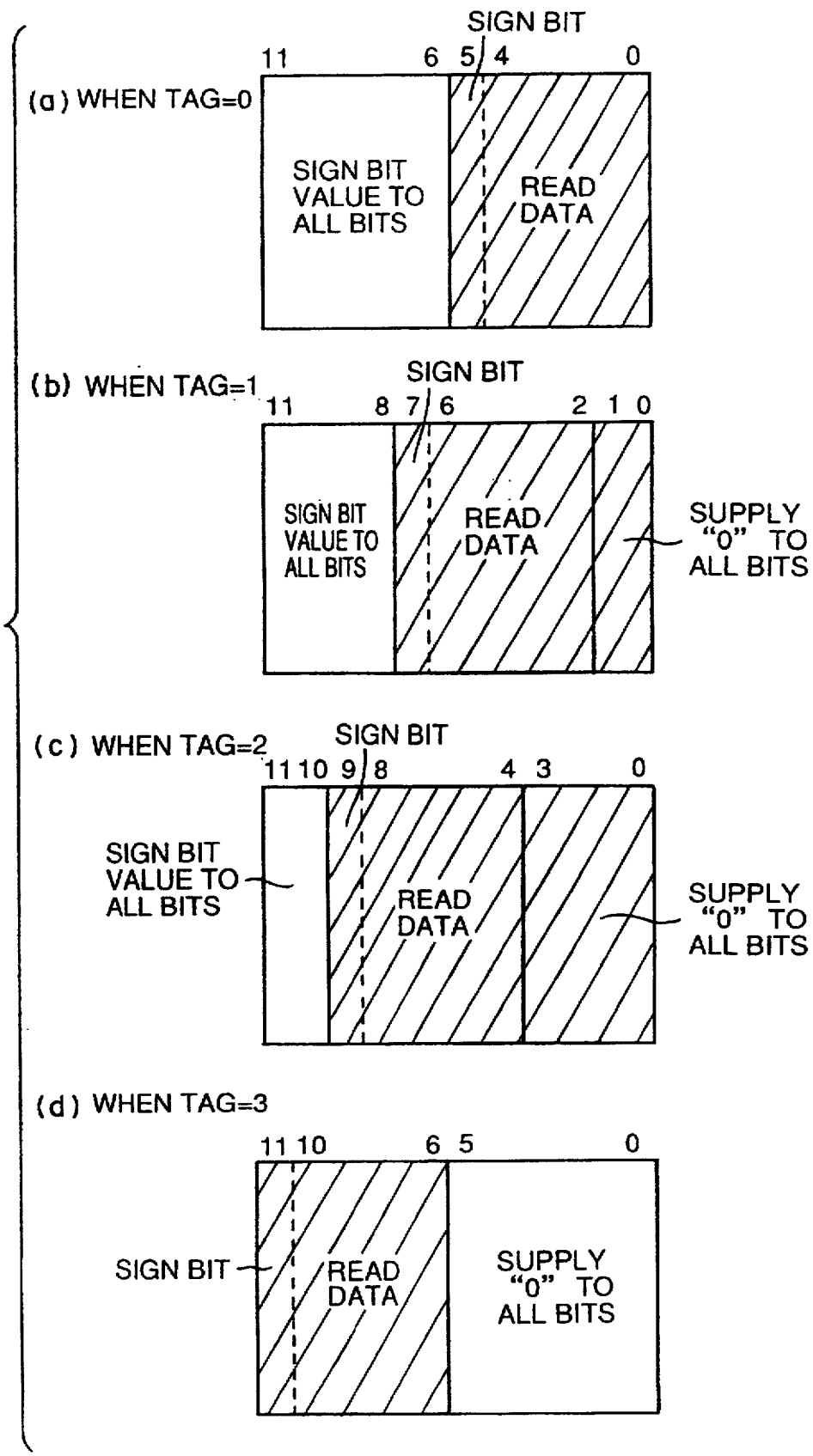
FIG. 22 is adapted to illustrate read data region selection on processing along the process algorithm shown in FIG. 20 at (a) to (d)

When the tag value TAG of the 8-bit data D12 is zero, the value of 6-bit data DATA in the 8-bit data D12 is supplied to fifth to zeroth bits of 12-bit data D3, while the value of the sign bit of the data DATA is supplied to the respective ones of 11th to sixth bits of data D13, as shown at (a) in FIG. 22.

When the tag value TAG of the 8-bit data D12 is 1, the value of the 6-bit data DATA in the 8-bit data D12 is supplied to seventh to second bits of the 12-bit data D13, while the value of the sign bit of the data DATA is supplied to the respective ones of the 11th to eighth bits of the data D13, and zero is supplied to the respective ones of the first and zeroth bits of the data D13, as shown at (b) in FIG. 22.

When the tag value TAG in the 8-bit data D12 is 2, the value of the 6-bit data DATA in the 8-bit data D12 is supplied to ninth to fourth bits of the 12-bit data D13, while the value of the sign bit of the data DATA is supplied to the respective ones of the 11th and 10th bits of the data D13 and zero is supplied to the respective ones of the third to zeroth bits, as shown at (c) in FIG. 22.

When the tag value TAG in the 8-bit data D12 is 3, the value of the 6-bit data DATA of the 8-bit data D12 is supplied to the 11th to sixth bits of the 12-bit data D13, and zero is supplied to the respective ones of the fifth to zeroth bits of the data D13, as shown at (d) in FIG. 22.

The circuit structure of the dynamic data precision conversion processing part 10 is now described.

Figure 23:
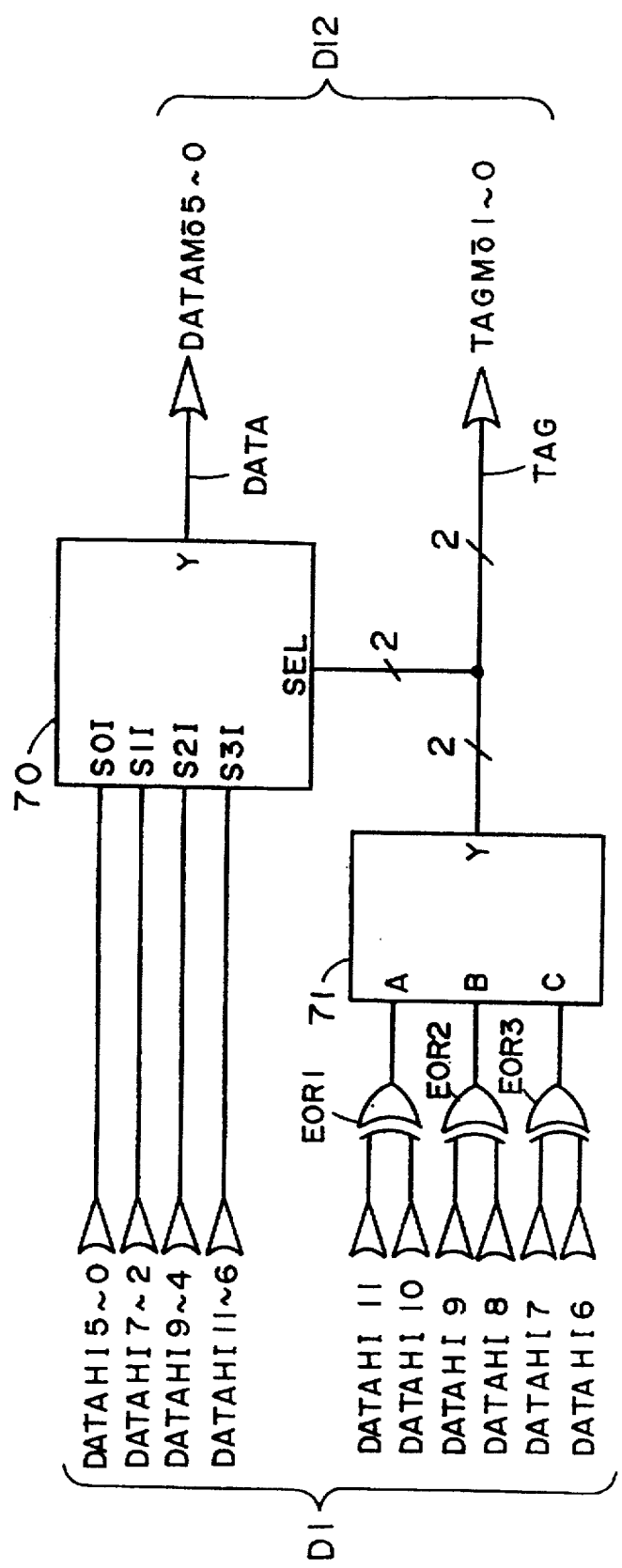
FIG. 23 illustrates an exemplary structure of a logic circuit related to write processing along the algorithm of FIG. 20 for the dynamic data precision conversion processing part shown in FIG. 19.

FIG. 23 illustrates an exemplary structure of a logic circuit related to write processing along the algorithm of FIG. 20 for the dynamic data precision conversion processing part shown in FIG. 19. Referring to FIG. 23, the processing part 10 includes an adder 71 for inputting the data D1 and generating the tag value TAG in relation to the write processing, exclusive OR elements EOR1 to EOR3 provided for respective ones of input terminals A to C of the adder 71, and a selector 70 for selecting and outputting the 6-bit data DATA to be written in the memory part 30 from 12 bits of the input data D1 on the basis of the tag value TAG.

Figure 24:
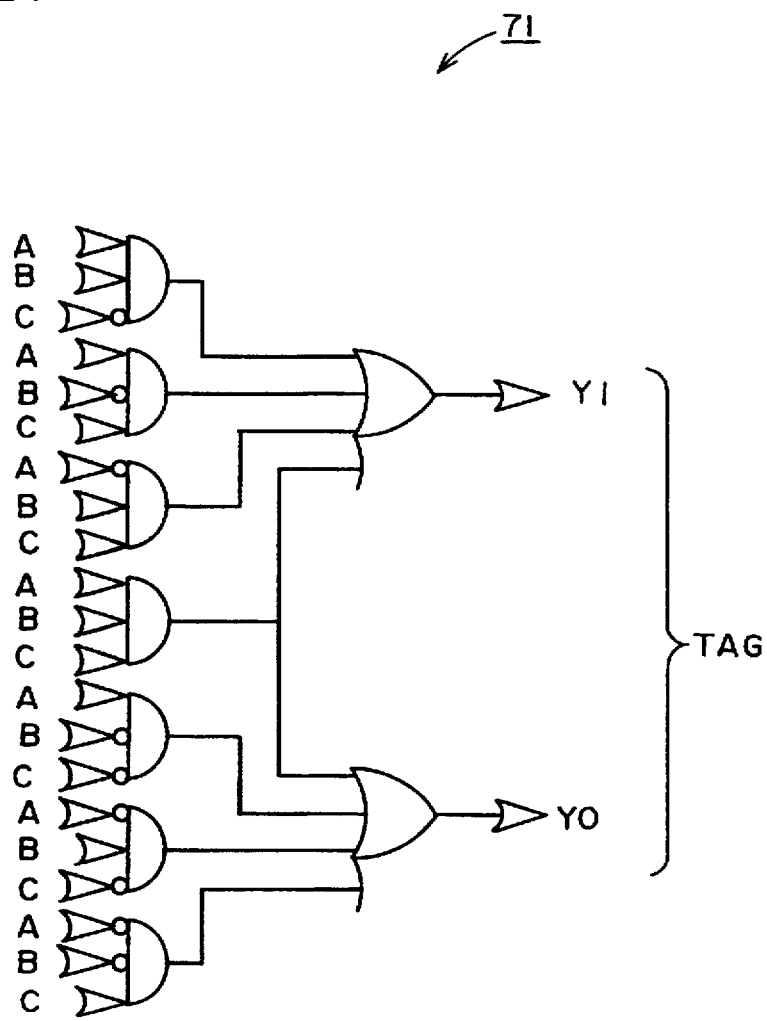
FIG. 24 illustrates an exemplary structure of a logic circuit of an adder shown in FIG. 23.

FIG. 24 illustrates an exemplary structure of a logic circuit of the adder 71 shown in FIG. 23.

Figure 25:
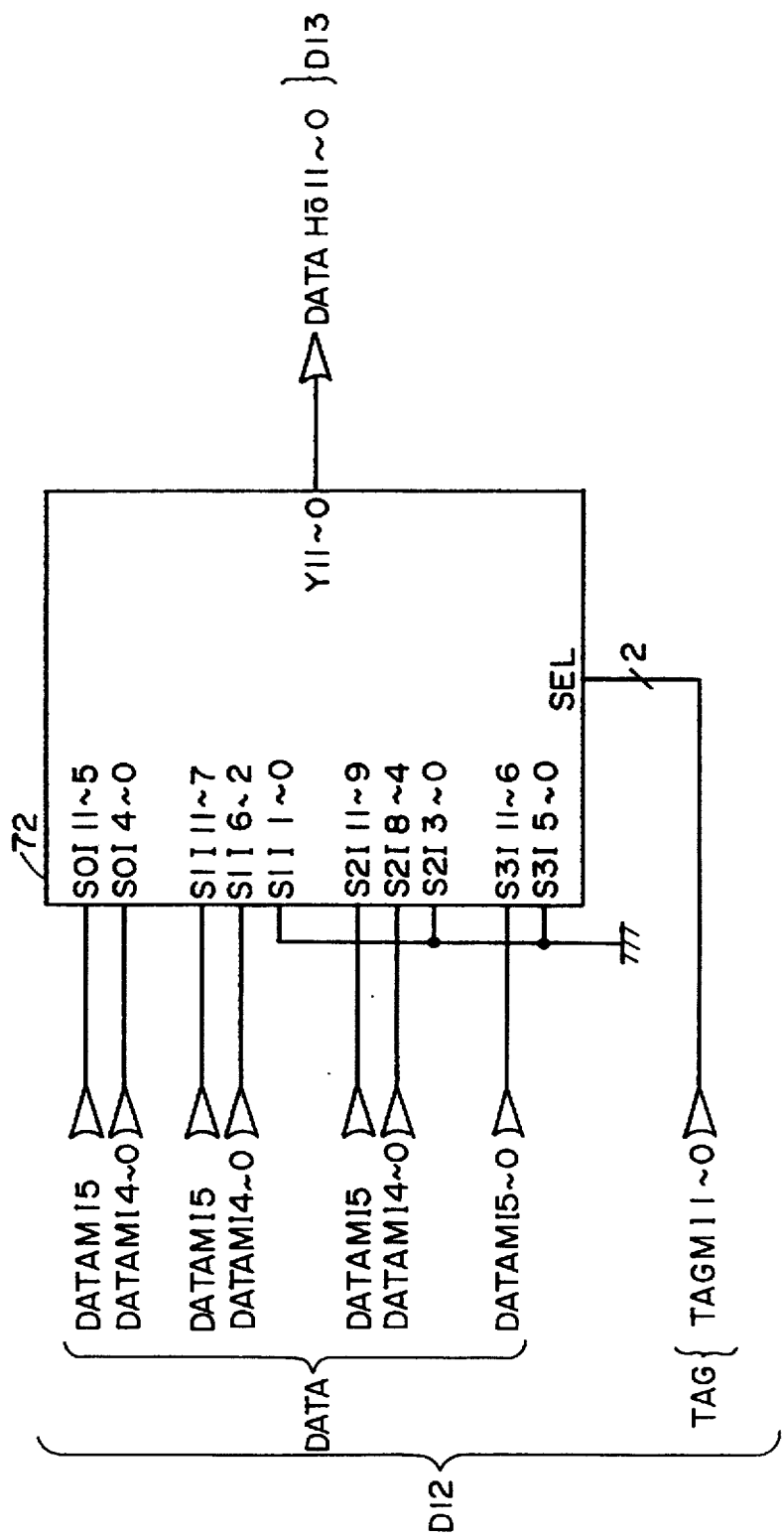
FIG. 25 illustrates an exemplary structure of a logic circuit related to read processing along the process algorithm of FIG. 20 for the dynamic data precision conversion processing part shown in FIG. 19.
Figure 26:
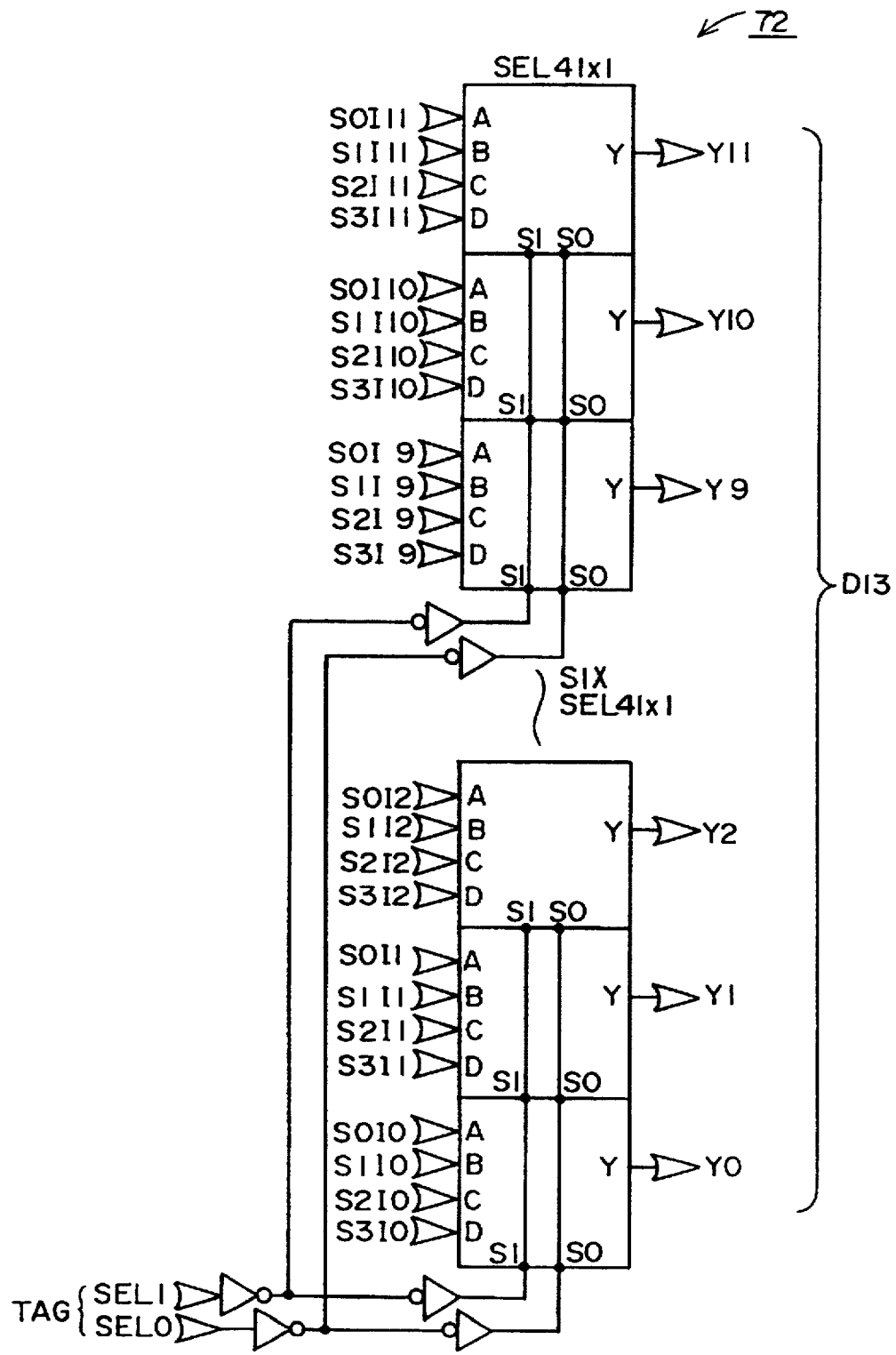
FIG. 26 illustrates an exemplary structure of a logic circuit of a selector shown in FIG. 25.

FIG. 25 illustrates an exemplary structure of a logic circuit related to read processing along the process algorithm of FIG. 20 for the dynamic data precision conversion processing part 10 shown in FIG. 19. Referring to FIG. 25, the dynamic data precision conversion processing part 10 includes a selector 72 in relation to the read processing. FIG. 26 illustrates an exemplary logic circuit structure of the selector 72. Referring to FIG. 26, 12-bit data through input terminals S0I11 to S0I0, S1I11 to S1I0, S2I11 to S2I0 and S3I11 to S3I0 are selected for output data D13 from output terminals Y11 to Y0 in correspondence to input values of 0, 1, 2 and 3 at a terminal SEL consisting of bits SEL1 and SEL0 forming the tag value TAG respectively in the selector 72. Thus, data read from the memory part 30 are classified by the tag value TAG of FIG. 22.

Figure 27:
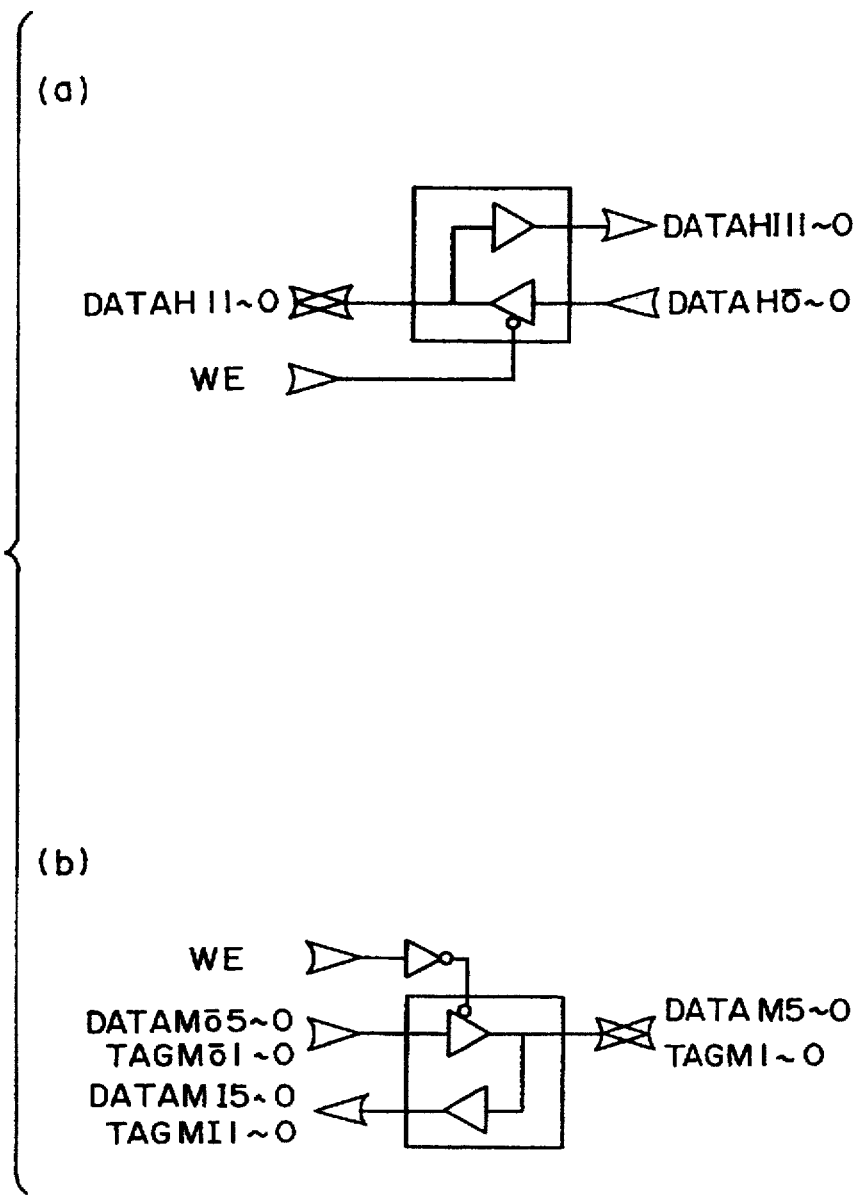
FIG. 27 illustrates exemplary structures of logic circuits of bi-direct output buffers operating along the process algorithm of FIG. 20 for the dynamic data precision conversion processing part shown in FIG. 19 at (a) and (b) respectively.

FIG. 27 illustrates exemplary structures of logic circuits of bi-direct output buffers operating along the process algorithm of FIG. 20 for the dynamic data precision conversion processing part 10 shown in FIG. 19 at (a) and (b) respectively.

This figure shows a bi-direct output buffer connecting the main processing part 20 with the dynamic data precision conversion processing part 10 and that connecting the dynamic data precision conversion processing part 10 with the memory part 30 at (a) and (b) respectively. Referring to FIG. 27, the data transmission direction in each bi-direct output buffer is uniquely decided by the signal level of a write enable signal WE. In more detail, the bi-direct output buffer operates as a transmission buffer of a read mode when the write enable signal WE is at a level 0, while the former operates as a transmission buffer of a write mode when the latter is at a level 1.

Alternatively, the information processor may be so formed as to connect the main processing part with the memory part through both of the aforementioned static precision conversion processing part 100 and the dynamic data precision conversion processing part 10.

Figure 28:
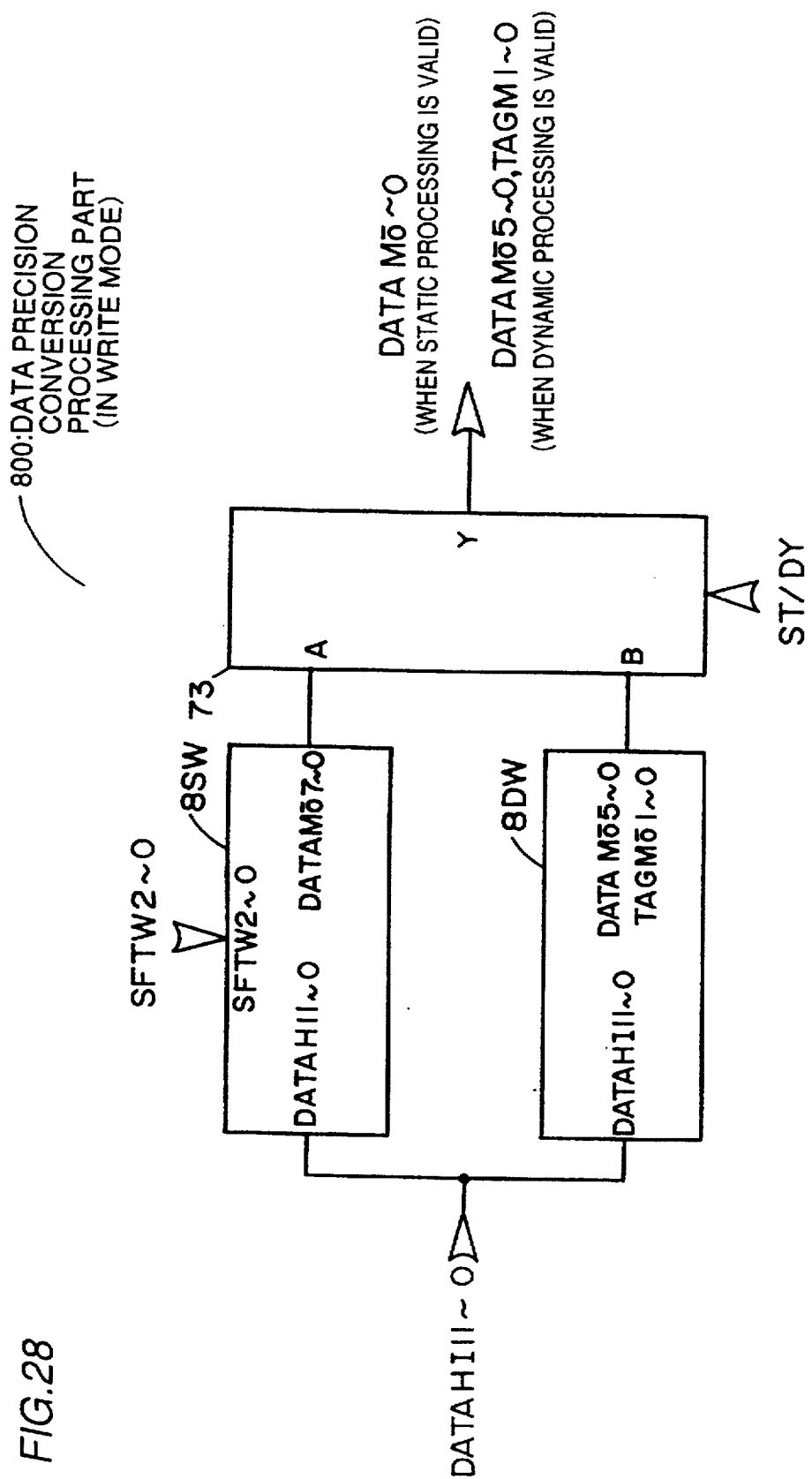
FIG. 28 illustrates an exemplary structure of a logic circuit of a data precision conversion processing part including static and dynamic data precision conversion processing parts according to still another embodiment of the present invention related to a write mode time.
Figure 29:
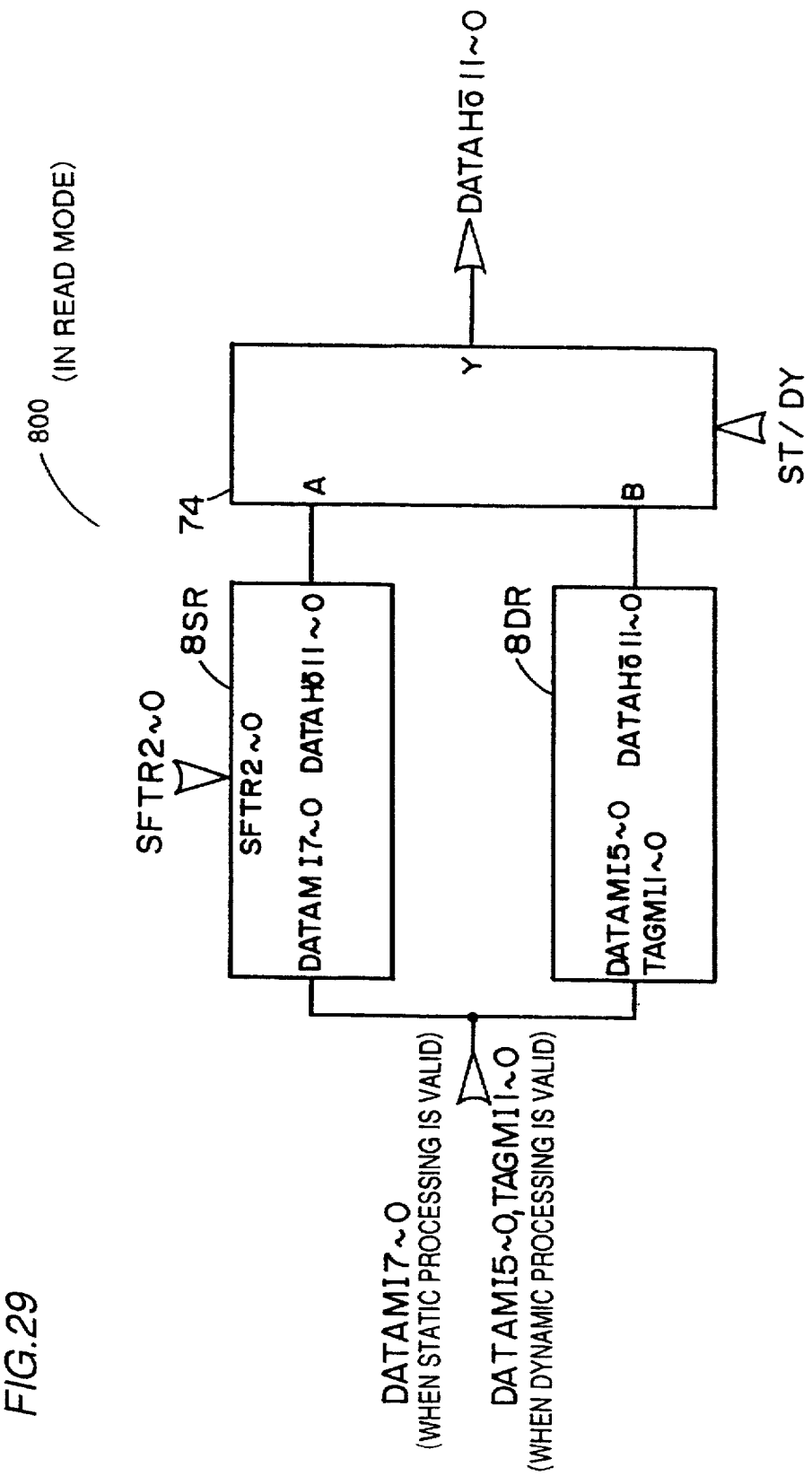
FIG. 29 illustrates an exemplary structure of the logic circuit of the data precision conversion processing part including the static and dynamic data precision conversion processing parts according to the embodiment of the present invention related to a read mode time.

FIGS. 28 and 29 illustrate exemplary structures of a logic circuit of a data precision conversion processing part 800 including static and dynamic data precision conversion processing parts according to still another embodiment of the present invention related to write and read modes respectively.

Referring to FIG. 28, the data precision conversion processing part 800 includes a static data precision conversion write processor 8SW (as to the detail, refer to FIG. 6), a dynamic data precision conversion write processor 8DW (as to the detail, refer to FIG. 23), and a selector 73 selecting and inputting either one of output values from the processors 8SW and 8DW on the basis of the value of a flag ST/DY and outputting the same for writing the same in a memory part in a write mode. The value of the flag ST/DY designates static/dynamic data precision conversion processing.

Referring to FIG. 29, on the other hand, the data precision conversion processing part 800 includes a static data precision conversion read processor 8SR (as to the detail, refer to FIG. 15), a dynamic data precision conversion read processor 8DR (as to the detail, refer to FIG. 25), and a selector 74 selecting and inputting either one of output values from the processors 8SR and 8DR on the basis of the value of the flag ST/DY and outputting the same for supplying the same to a main processing part in a read mode.

The value of the flag ST/DY may be supplied from the main processing part in response to the content of information processing, or directly supplied from the exterior by terminal setting. The value of the flag ST/DY may be so set as to perform static data precision conversion processing in case of executing information processing employing shift operation processing in the main processing part, or to perform dynamic data precision conversion processing when data precision conversion processing based on the data content is desired, for example.

FIG. 30 illustrates exemplary structures of logic circuits of a bi-direct output buffer coupling the main processing part with the conversion processing part and that coupling the conversion processing part with the memory part at (a) and (b) respectively in case of employing the data precision conversion processing part 800 shown in FIGS. 28 and 29.

This figure shows the bi-direct output buffer connecting the main processing part with the data precision conversion processing part 800 shown in FIGS. 28 and 29 and that connecting the data precision conversion processing part 800 with the memory part at (a) and (b) respectively. Referring to FIG. 30, the data transmission direction in each bi-direct output buffer is uniquely decided by the signal level of a write enable signal WE. In more detail, the bi-direct output buffer operates as a transmission buffer of a read mode when the write enable signal WE is at a level 0, while the former operates as a transmission buffer of a write mode when the latter is at a level 1.

Description is now made on an effect of reducing the memory capacity due to employment of the aforementioned data precision conversion processing part.

Figure 31:
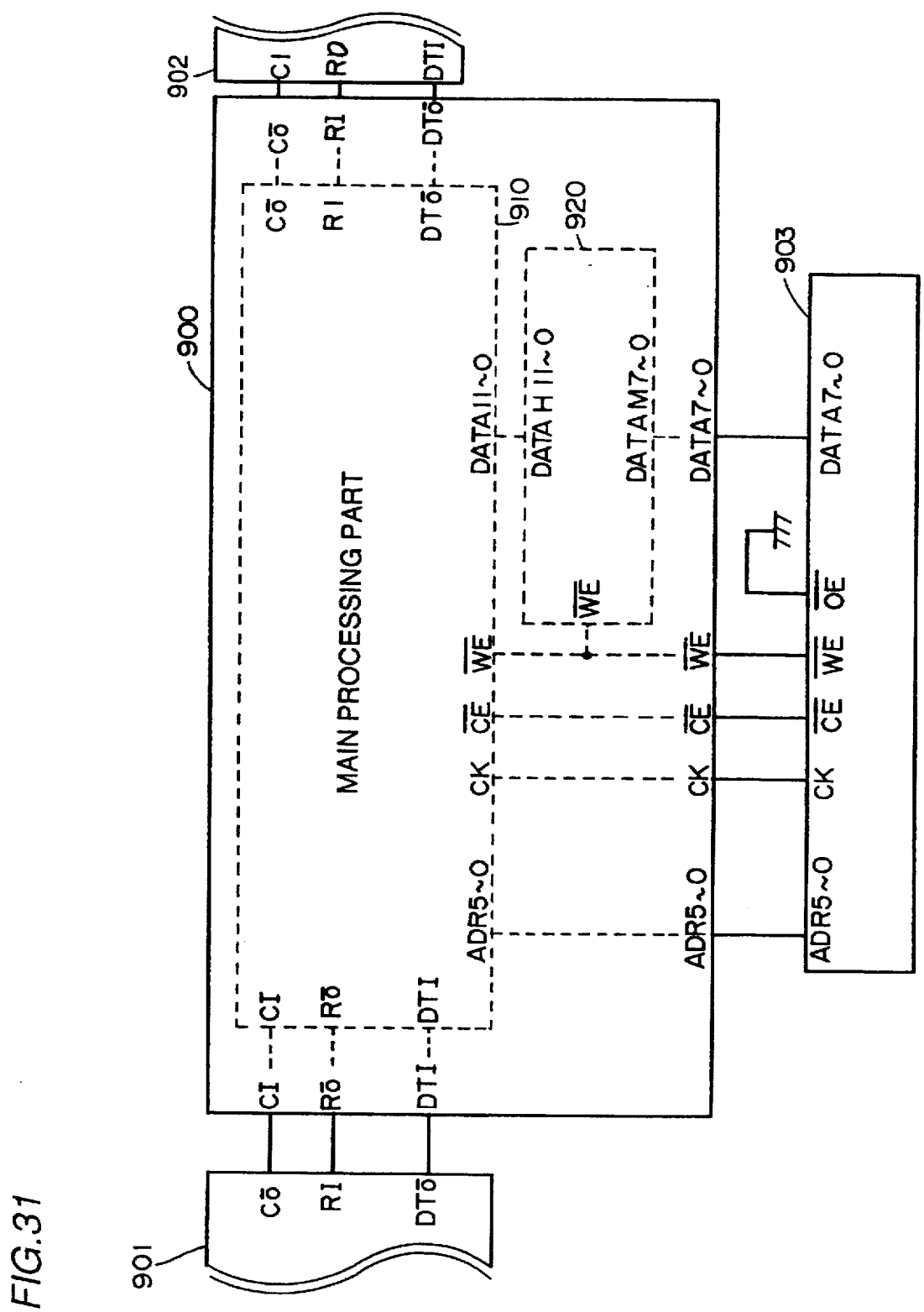
FIG. 31 illustrates an exemplary structure of a system employing a data driven type processor including the data precision conversion processing part according to the embodiment of the present invention.

FIG. 31 illustrates an exemplary structure of a system employing a data driven type processor including the data precision conversion processing part according to this embodiment.

The system of FIG. 31 is formed by interconnecting a plurality of data driven type processors including a data driven type processor 900. The processor 900 includes a main processing part 910 and a static data precision conversion processing part 920, for example, serving as a data precision conversion processing part. This processor 900 is connected with data driven type processors 901 and 902 on its input and output stages respectively, while the same is externally connected with a RAM (random access memory) 903. The main processing part 910 accesses the RAM 903 through the static data precision conversion processing part 920. While the data precision conversion processing part is formed by the static data precision conversion processing part 920 in this embodiment, the same may alternatively be formed by a dynamic data precision conversion processing part.

It is assumed that the bit widths of the data transferred between the main processing part 910 and the RAM 903 are set at 12 bits and 8 bits on the main processing part 910 side and on the RAM 903 side respectively, and the number of words storable in the RAM 903 is set at 32 in the processor 900. In this case, the memory capacity of the RAM 903 is 32×8=256 bits. If the main processing part 910 is directly connected with the RAM 903 with no provision of the static data precision conversion processing part 920 in the processor 900, however, 12 bits are required for one word on the RAM 903 side and the necessary memory capacity is 384 bits. Namely, it comes to that the memory capacity required for the RAM 903 is reduced to 256/384=¾ times as compared with the case of employing no static data precision conversion processing part 920, due to the employment of the processing part 920.

As hereinabove described, it is possible to reduce the bit width of the employed memory part as well as the memory capacity while enabling correct arithmetic processing by employing a system structure of accessing the memory part through static or dynamic data precision conversion processing when correct arithmetic processing cannot be performed by simply reducing the bit width of memory part side data or simply employing a partial region of the bit width of main processing part side data, i.e., when clipping processing or round-off processing is required for writing data outputted from the main processing part in the memory part in a system transferring data between the main processing part and the memory part with no requirement for bit precision corresponding to the bit width on the exterior of the main processing part in relation to the data transferred to the memory part.

Along the set bit width of FIG. 1, it comes to that the memory capacity is reduced to m/h times.

Figure 32:
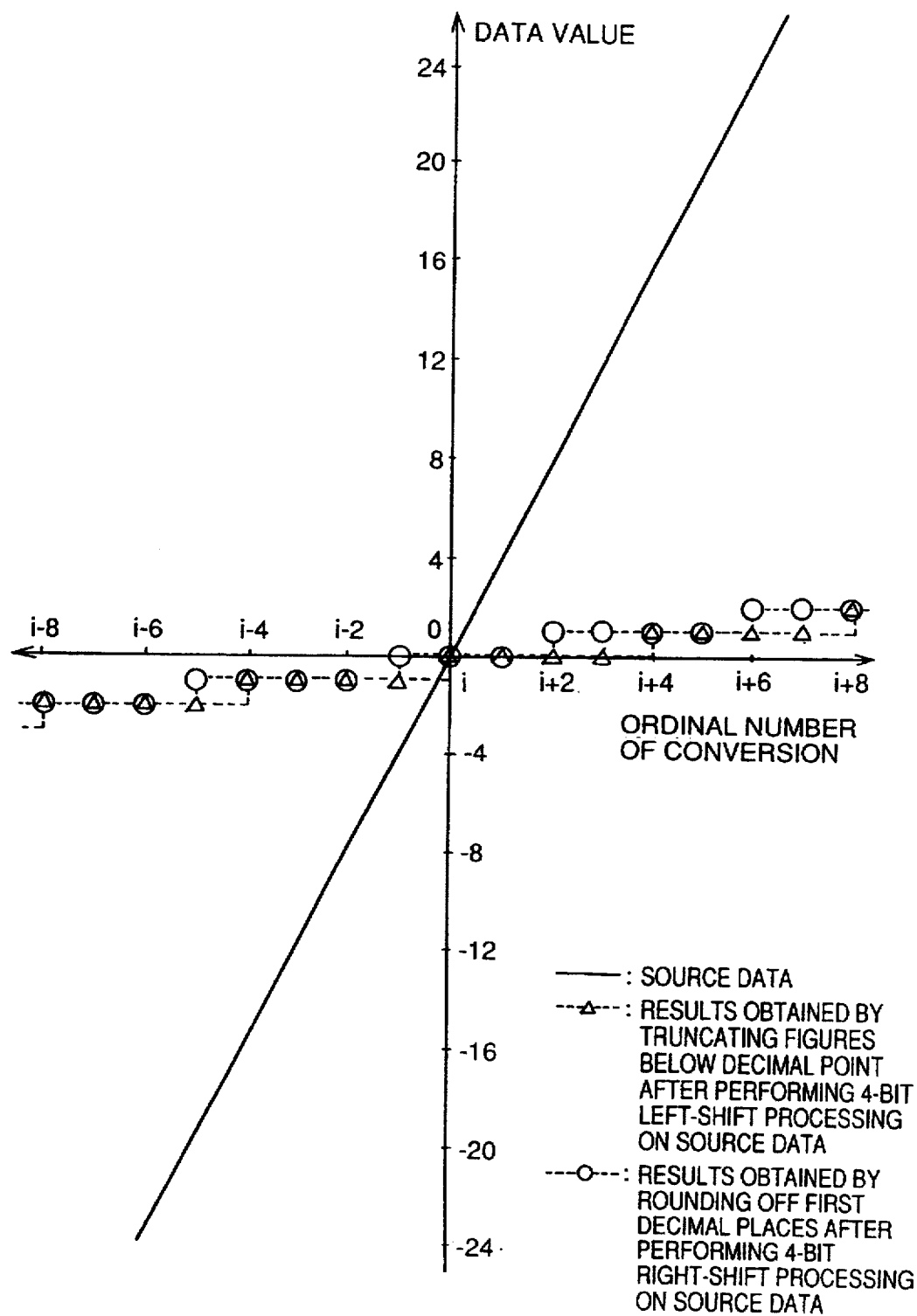
FIG. 32 is adapted to illustrate validity of roundoff processing in the data precision conversion processing part according to the embodiment of the present invention.
Figure 33:
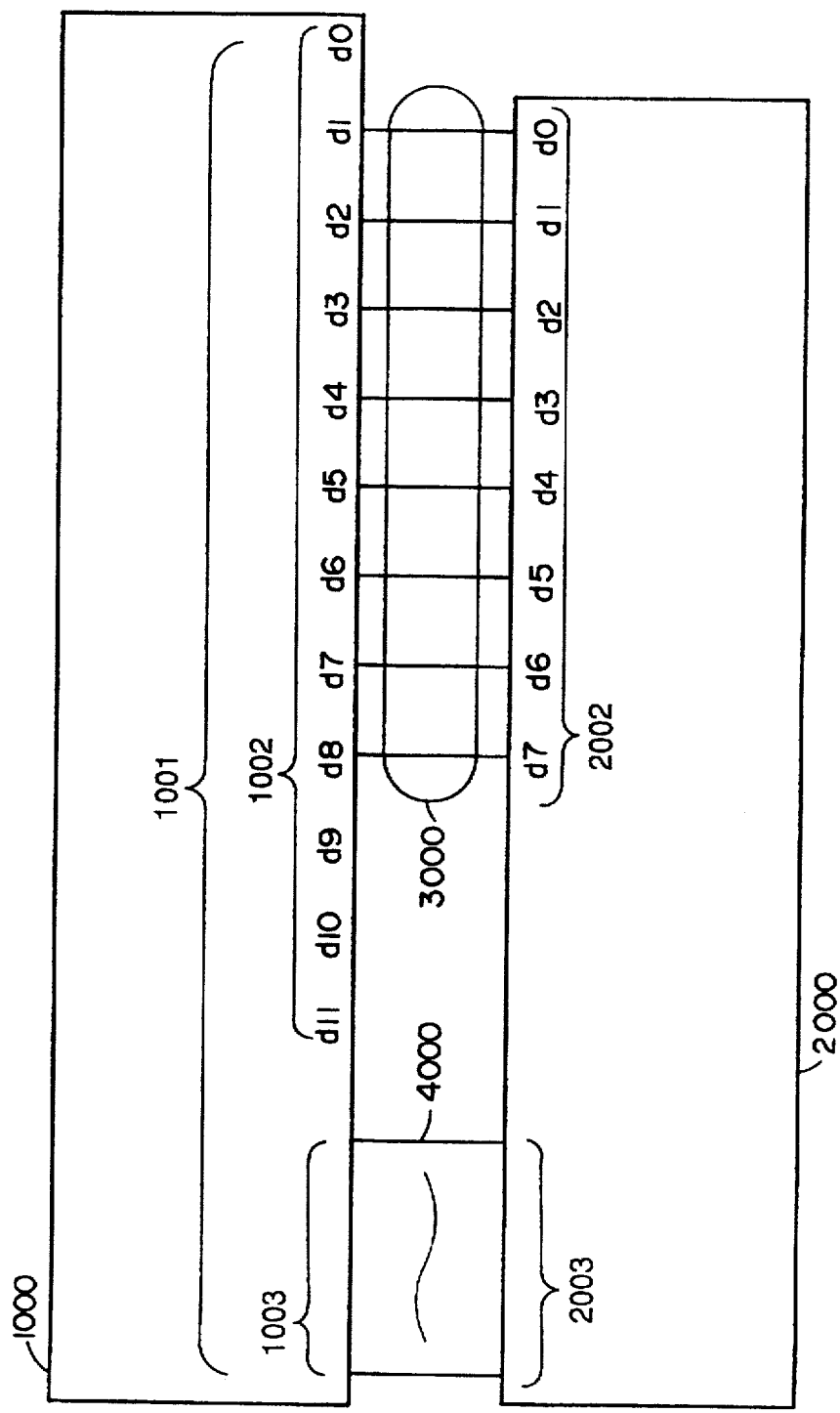
FIG. 33 illustrates exemplary connection between a main processing part and a memory part in a conventional information processor.

Validity of the round-off processing in the aforementioned static data precision conversion processing part is now described. FIG. 32 is adapted to illustrate the validity of the round-off processing in the data precision conversion processing part according to the embodiment.

When no round-off processing but truncation processing is performed, the following problem arises, for example: It is assumed here that data conversion of truncating lower bits of source data and employing only higher bits is applied to modulated data (including no DC component) of image processing, for example. In this case, data by higher bits obtained by truncating lower bits of modulated data disadvantageously contain DC components, and no desirable output signal can be obtained in image processing. The round-off processing is valid for solving this problem.

FIG. 32 illustrates correlation between data values and conversion ordinal numbers. The conversion ordinal numbers show the order of change of values of converted data obtained by converting data values along a prescribed procedure with reference to a variable i.

Referring to FIG. 32, the solid line indicates the case of expressing source data values in two's complement expression of a 12-bit length, dotted lines plotted with triangular marks show the case of performing 4bit right-shift processing on source data and thereafter truncating the figures below the decimal point, and dotted lines plotted with circular marks show the case of performing 4-bit right-shift processing on source data and thereafter rounding off the first decimal place respectively.

As shown in FIG. 32, the truncated data (see the dotted lines plotted with the triangular marks) have no point symmetry with respect to the conversion ordinal number (=i) of the source data shown by the solid line. Namely, the dotted lines plotted with the triangular marks are distorted into shapes containing DC components which must have not been contained in the source data. The round-off processing is valid for solving this problem. As shown in FIG. 32, rounded data (see dotted lines plotted with circular marks) preserve the aforementioned point symmetry of the source data shown by the solid line.

Validity of clipping processing in the aforementioned static data precision conversion processing part is now described.

As to aforementioned data conversion truncating the higher bits of the source data and employing only the lower bits, only source data having a range defined by the bit number of the lower bits are employable. Consider that the source data is of 12 bits (two's complement expression) and only lower 8 bits are employed. In this case, the truncation processing is valid when the minimum and maximum values of the range of the source data are −128 and 127 respectively. When the range is out of the aforementioned one, however, values of the data after truncation are not uniquely determined. For example, four values of "000001010101 (85)", "010101010101 (1365)", "111101010101 (−171)" and "101001010101 (−1451)" cannot be independently identified. The aforementioned clipping processing is valid for solving this problem. When the clipping processing is employed, converted data are uniquely determined also when the range of the source data exceeds that defined by the bit number of lower bits with truncation of higher bits, whereby it is possible to solve such a problem that information processing is not correctly performed in the main processing part.

While non-data system signals are transferred through neither static nor dynamic data precision conversion processing part in each of the aforementioned embodiments, the same may alternatively be transferred through the processing parts. In this case, the non-data system signals are not processed in these processing parts (through-processed).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transfer control unit having a bit width control part for controlling the bit width of data being transferred between a memory part and a processing part executing information processing, said memory part and said processing part being in an information processor, said bit width control part matching a first bit width of a port for inputting/outputting said data on said processing part side with a second bit width, being narrower than said first bit width, of a port for inputting/outputting said data on said memory part side, said bit width control part comprising:
   first conversion means for converting the bit width of said data to said second bit width in case of transferring said data from said processing part to said memory part, and
   second conversion means for converting the bit width of said data to said first bit width in case of transferring said data from said memory part to said processing part.

2. The data transfer control unit in accordance with claim 1, wherein
   said first conversion means includes rightward bit shift processing means performing rightward bit shift processing on said data being transferred from said processing part to said memory part for providing the same with said second bit width.

3. The data transfer control unit in accordance with claim 2, wherein
   said second conversion means includes leftward bit shift processing means for performing leftward bit shift processing on said data being transferred from said memory part to said processing part for providing the same with said first bit width.

4. The data transfer control unit in accordance with claim 2, wherein
   said first conversion means is further provided with round-off processing means for rounding off said data being subjected to said rightward bit shift processing for providing the same with said second bit width.

5. The data transfer control unit in accordance with claim 4, wherein
   said second conversion means includes leftward bit shift processing means for performing leftward bit shift processing on said data being transferred from said memory part to said processing part for providing the same with said first bit width.

6. The data transfer control unit in accordance with claim 1, wherein
said first conversion means includes clipping processing means for performing clipping processing on said data being transferred from said processing part to said memory part for providing the same with said second bit width.

7. The data transfer control unit in accordance with claim 6, wherein
said second conversion means includes leftward bit shift processing means for performing leftward bit shift processing on said data being transferred from said memory part to said processing part for providing the same with said first bit width.

8. The data transfer control unit in accordance with claim 1, wherein
said second conversion means includes leftward bit shift processing means for performing leftward bit shift processing on said data being transferred from said memory part to said processing part for providing the same with said first bit width.

9. A data transfer control unit having a bit width control part for controlling the bit width of data being transferred between a memory part and a processing part executing information processing, said memory part and said processing part being in an information processor, said bit width control part matching a first bit width of a port for inputting/outputting said data on said processing part side with a second bit width, being narrower than said first bit width, of a port for inputting/outputting said data on said memory part side,
said bit width control part further comprising:
means for converting the bit width of said data to said second bit width on the basis of the content of said data in case of transferring said data from said processing part to said memory part, and
means for converting the bit width of said data to said first bit width on the basis of the content of said data in case of transferring said data from said memory part to said processing part.

10. The data transfer control unit in accordance with claim 9, wherein said bit width control part further comprises a tag value generator classifying data in said processing part based on an internal bit value structure and providing a tag value to be transferred between said memory part and said processing part.

11. The data transfer control unit in accordance with claim 10, wherein particular bits transferred between said memory part and said processing part are selected in accordance with said tag value.

12. A data transfer control unit having a bit width control part for controlling the bit width of data being transferred between a memory part and a processing part executing information processing, said memory part and said processing part being in an information processor, said bit width control part matching a first bit width of a port for inputting/outputting said data on said processing part side with a second bit width, being narrower than said first bit width, of a port for inputting/outputting said data on said memory part side,
said bit width control part being provided with a first bit width control part and a second bit width control part,
said first bit width control part being provided with:
means for converting the bit width of said data to said second bit width in case of transferring said data from said processing part to said memory part, and
means for converting the bit width of said data to said first bit width in case of transferring said data from said memory part to said processing part,
said second bit width control part being provided with:
means for converting the bit width of said data to said second bit width on the basis of the content of said data in case of transferring said data from said processing part to said memory part, and
means for converting the bit width of said data to said first bit width on the basis of the content of said data in case of transferring said data from said memory part to said processing part,
either one of said first and second bit width control parts being selectively activated in said case of transferring said data.

13. The data transfer control unit in accordance with claim 12, wherein said processing part selectively activates one of said first and second bit width control parts in accordance with a type of processing operation.

* * * * *